US010007882B2

(12) United States Patent
Belenzon et al.

(10) Patent No.: US 10,007,882 B2
(45) Date of Patent: Jun. 26, 2018

(54) SYSTEM, METHOD AND APPARATUS TO DETERMINE ASSOCIATIONS AMONG DIGITAL DOCUMENTS

(76) Inventors: Sharon Belenzon, Tel-Aviv (IL); Liat Belinson, Tel-Aviv (IL)

( * ) Notice: Subject to any disclaimer, the term of this patent is extended or adjusted under 35 U.S.C. 154(b) by 612 days.

(21) Appl. No.: 13/000,025

(22) PCT Filed: Jun. 23, 2009

(86) PCT No.: PCT/IL2009/000621
§ 371 (c)(1),
(2), (4) Date: Dec. 20, 2010

(87) PCT Pub. No.: WO2009/156987
PCT Pub. Date: Dec. 30, 2009

(65) Prior Publication Data
US 2011/0093449 A1    Apr. 21, 2011

Related U.S. Application Data

(60) Provisional application No. 61/136,414, filed on Sep. 3, 2008, provisional application No. 61/129,408, filed on Jun. 24, 2008.

(51) Int. Cl.
*G06F 17/30* (2006.01)
*G06N 7/00* (2006.01)

(52) U.S. Cl.
CPC .................... *G06N 7/005* (2013.01)

(58) Field of Classification Search
USPC ................................. 707/705–708
See application file for complete search history.

(56) References Cited

U.S. PATENT DOCUMENTS

| 5,864,855 | A | | 1/1999 | Ruocco et al. |
| 6,038,561 | A | * | 3/2000 | Snyder et al. |
| 6,629,097 | B1 | * | 9/2003 | Keith |

(Continued)

FOREIGN PATENT DOCUMENTS

| CN | 1701343 (Part I) | 11/2005 |
| CN | 1701343 (Part II) | 11/2005 |

(Continued)

OTHER PUBLICATIONS

International Preliminary Report on Patentability dated Jan. 13, 2011 From the International Bureau of WIPO Re. Application No. PCT/IL2009/000621.

(Continued)

*Primary Examiner* — Mark D Featherstone
*Assistant Examiner* — Navneet Gmahl
(74) *Attorney, Agent, or Firm* — Federico Fraccaroli

(57) ABSTRACT

A search engine for searching based on related scientific or technological concepts, comprises: a learning module for learning about relationships between technical phrases based on their rates of occurrence in related documents, therefrom to form concepts from groupings of related phrases, and a search module for searching for related documents to a query document based on occurrence in said related documents of concepts present in said query document, the learning module carrying out said learning based on a training set of documents and inter-document relations.

24 Claims, 18 Drawing Sheets
(9 of 18 Drawing Sheet(s) Filed in Color)

(56) References Cited

U.S. PATENT DOCUMENTS

| | | | |
|---|---|---|---|
| 6,757,692 B1* | 6/2004 | Davis | G06F 17/30707 707/692 |
| 8,751,218 B2* | 6/2014 | Dang | G06F 17/2785 704/9 |
| 2003/0026459 A1 | 2/2003 | Won et al. | |
| 2003/0115191 A1* | 6/2003 | Copperman | G06F 17/30976 |
| 2004/0093331 A1* | 5/2004 | Garner et al. | 707/3 |
| 2005/0071310 A1* | 3/2005 | Eiron et al. | 707/1 |
| 2005/0182755 A1* | 8/2005 | Tran | 707/3 |
| 2005/0198026 A1* | 9/2005 | Dehlinger | G06F 17/2881 |
| 2005/0210008 A1* | 9/2005 | Tran et al. | 707/3 |
| 2005/0210009 A1* | 9/2005 | Tran | 707/3 |
| 2007/0208719 A1* | 9/2007 | Tran | 707/3 |
| 2008/0010272 A1* | 1/2008 | Schickel-Zuber | G06F 17/30734 |
| 2008/0126920 A1 | 5/2008 | Otaka et al. | |
| 2012/0143880 A1* | 6/2012 | Sweeney | G06F 17/30867 707/749 |
| 2016/0162486 A1* | 6/2016 | Biswas | G06F 17/30705 707/729 |

FOREIGN PATENT DOCUMENTS

| | | |
|---|---|---|
| CN | 1701343 (Part III) | 11/2005 |
| CN | 1701343 (Part IV) | 11/2005 |
| CN | 1701343 (Part V) | 11/2005 |
| EP | 1736902 | 12/2006 |
| GB | 2365569 | 2/2002 |
| GB | 2417115 | 2/2006 |
| JP | 2000-105769 | 4/2000 |
| JP | 2004-152231 | 5/2004 |
| JP | 2006-251935 | 9/2006 |
| JP | 2007-005807 | 1/2007 |
| JP | 2008-102758 | 5/2008 |
| WO | WO 2004/027706 | 4/2004 |
| WO | WO 2009/156987 | 12/2009 |

OTHER PUBLICATIONS

International Search Report and the Written Opinion dated Jun. 1, 2010 From the International Searching Authority Re. Application No. PCT/IL2009/000621.

Baker et al. "Distributional Clustering of Words for Text Classification", Proceedings of the 21st Annual International ACM SIGIR Conference on Research and Development in Information Retrieval, Melbourne, Australia, XP002582182, p. 96-103, Dec. 31, 1998.

He et al. "Text Categorization Using Distributional Clustering and Concept Extraction", Advanced Intelligent Computing Theories and Applications. With Aspects of Theorteical and Methodological Issues, Lecture Notes in Computer Science, XP019066848, p. 720-729, Aug. 21, 2007.

Veiling et al. "Conceptual Grouping in Word Co-Occurence Networks", Proceedings of the 16th International Joint Conference on Artificial Intelligence, IJAI 1999, p. 694-701, Aug. 6, 1999.

Translation of Office Action dated May 6, 2013 From the State Intellectual Property Office of the People's Republic of China Re. Application No. 200980133803.1.

Translation of Search Report dated May 6, 2013 From the State Intellectual Property Office of the People's Republic of China Re. Application No. 200980133803.1.

Translation of Notice of Reason for Rejection dated Aug. 23, 2013 From the Japanese Patent Office Re. Application No. 2011-515727.

Decision of Rejection dated Feb. 4, 2014 From the Japanese Patent Office Re. Application No. 2011-515727 and Its Translation Into English.

* cited by examiner

SYSTEM, METHOD AND APPARATUS TO DETERMINE ASSOCIATIONS AMONG DIGITAL DOCUMENTS

RELATED APPLICATIONS

This Application is a National Phase of PCT Patent Application No. PCT/IL2009/000621 having International filing date of Jun. 23, 2009, which claims the benefit of U.S. Provisional Patent Application Nos. 61/136,414 filed on Sept. 3, 2008; and 61/129,408 filed on Jun. 24, 2008. The contents of the above Applications are all incorporated herein by reference.

FIELD AND BACKGROUND OF THE INVENTION

The present invention, in some embodiments thereof, relates to a search engine and methodology and, more particularly, but not exclusively, to such a search engine and methodology applicable to patent literature, for carrying out patent searches.

Central to corporations' growth and prosperity is patenting of knowledge assets. The number of patent applications has risen drastically in the past decade reaching about 1 million new applications per year in the United States and Europe alone.

Prior-art search is a critical part of the patent application process and is a determinant of patent scope. When the patent applicant fails to identify all relevant prior-art, the application claims may be rejected by the examiner, or may be subject to costly litigation in case the patent is granted.

To be granted, a patent claim has to satisfy two conditions in respect of the prior art: it has to be novel and non-obvious. Novelty means that the claim has to exclusively define a new piece of knowledge that has not been patented in the past and has not been published in public sources. Obviousness means that the inventive step, i.e., the technical advance over existing knowledge, has to be something more than just a straightforward change. To determine whether a new patent application is indeed novel and non-obvious, the patent examiner searches for related prior-art in other patent documents and public sources.

The market for prior-art search is developing rapidly following the exponential growth in patent filings. FIGS. 1 and 2 show the increase in the number of patent filings world-wide and across leading patent offices. In 2005, about 1,660,000 patent applications were filed worldwide. Patent application filings have risen at an annual rate of 4.7% since 1995.

Prior-art search occurs at every stage of the innovation process. The inventor conducts prior-art search to research the field and also to examine the novelty of her idea and its patentability, the venture-capitalist conducts prior-art search to assess commercial value, the patent attorney conducts prior-art search when filing patent applications and the patent examiner searches for prior-art to determine patentability and patent scope. We (conservatively) estimate the annual market size for patent prior-art search at $4 billion (this number reflects two million prior-art searches at a cost of $2,000 per search).

The search for prior-art is also central to the wider market of technology licensing. The market for technology licensing is rapidly increasing and is estimated at of billions of dollars per year.

Finally, the search for prior-art is integral to patent litigation, particularly infringement and invalidation suits. About 1,000 cases of patent litigations are filed each year in the United States. There are no clear estimates of the monetary transfer associated with these litigations which can vary from zero (the result of cross-licensing agreements) to hundred of millions of US dollars (for example, in the Blackberry litigation case RIM paid NTP $612.5 million).

The search for prior-art spans million of patent documents. The main challenge for automated prior-art search is how to identify scientific relations based on textual features for large scale datasets of patent documents. A common assumption by existing search engines is that semantic similarity of patent documents reflects scientific relatedness. This assumption performs poorly in practice as usually scientific relatedness is not tied to semantic similarity. In practice, related scientific ideas usually include different scientific concepts. Determining the conceptual relatedness of words and technical phrases requires specialized professional knowledge and evaluations of hundred of thousands related technologies. Up to recently, such systematic knowledge was almost impossible to obtain. The problem is particularly acute in the software field where technical usage varies widely.

Current Market Solution

Several for-profit and non-for-profit patent search engines have emerged in the past few years. Leading prior-art search engines are: USPTO, EPO, Google Patent, Dialog and Delphion.

These search engines are mostly based on semantic similarity analysis, also known as the bag-of-words approach (BOW). The search process computes the relatedness of documents based on measures of textual overlap of words in each document or query. Essentially, the central assumption is that patents that represent related scientific ideas share common or similar semantics. To the extent this assumption is violated, the performance of existing search engines would not be satisfactory.

The main drawback of the semantic similarity approach, including its extensions (see below), is that it does not provide any information about the conceptual meaning of words and technical phrases. For example, the word x can represent exactly the same idea as the word y. Without external information, or a scientific 'dictionary', that informs us that x and y represent the same idea, information retrieval which is based on semantic similarity would fail.

There are four main reasons for the poor performance of semantic search engines in the field of patent prior-art search. First, inventors have an incentive to phrase their inventions in a manner that would be as distant as possible from the text of the most related prior-art, hoping this would mitigate the risk the application would be rejected by the examiner.

Second, the textual domain used to describe scientific concepts is typically large.

Third, in numerous cases the prior-art cited by the patent examiner is from different technological areas than the application itself, where there is very little textual overlap between the prior-art and the application. For example, U.S. Pat. No. 7,137,001, entitled "Authentication of Vehicle Components" (IPC H04L Transmission of Digital Information), shares very little semantic similarity with U.S. Pat. No. 5,220,604 (IPC G06F Electric Digital Data Processing), entitled "Method for Performing Group Exclusion in Hierarchical Group Structures". Yet, during the application process of U.S. Pat. No. 7,137,001, the patent examiner cited U.S. Pat. No. 5,220,604 as related prior-art and as a reason to reject the initial application on the grounds of obviousness. Another example is U.S. Pat. No. 7,051,570, entitled, "System and Method for Monitoring a Pressurized System" (IPC G01L Measuring Force, Stress, Torque, Work, Mechanical Power, Mechanical Efficiency, or Fluid Pressure), which was rejected by the patent examiner over U.S. Pat. No. 5,454,024, entitled "Cellular Digital Packet Data Network Transmission System Incorporating Cellular Link Integrity Monitoring" (IPC G08B Signalling).

Fourth, patent documents usually include technical phrases (for example, CMOS —Complementary metal-oxide semiconductor and PMOS—Positive metal oxide semiconductor or Portable media operating system). Semantic similarity would fail to recognize relationships between different technical phrases as they are likely to have little textual similarity. For example, based on patent examiner evaluations, we find that the technical phrases PMG (permanent magnet generator) and BLDC (brushless DC controller) are related scientifically, although they differ textually.

Additional background art includes U.S. Pat. No. 4,839,853 Computer information retrieval using latent semantic structure. A methodology for retrieving textual data objects is disclosed. The information is treated in the statistical domain by presuming that there is an underlying, latent semantic structure in the usage of words in the data objects. Estimates to this latent structure are utilized to represent and retrieve objects. A user query is recouched in the new statistical domain and then processed in the computer system to extract the underlying meaning to respond to the query.

U.S. Pat. No. 5,297,039 Text search system for locating on the basis of keyword matching and keyword, teaches a text information extraction device extracts analysis networks from texts and stores them in a database. The analysis networks consist of lines each including elements and relations extracted from the texts. The analysis networks are complemented via synonym/near synonym/thesaurus process and via complementary template and the lines thereof are weighted via concept template. A text similarity matching device judges similarity of input and database analysis networks on the basis of agreements of words, word pairs, and lines. A text search system stores texts and complementary term lists prepared therefrom in respective databases. Queries are inputted in the form of analysis networks from which sets of keywords and relations are extracted. After searching the texts and complementary term lists stored in databases with respect to the keywords extracted from each input query, agreements of the sets of keywords and relations are determined.

U.S. Pat. No. 5,963,965 Text processing and retrieval system and method teaches a content-based system and method for text processing and retrieval is provided wherein a plurality of pieces of text are processed based on content to generate an index for each piece of text, the index comprising a list of phrases that represent the content of the piece of text. The phrases are grouped together to generate clusters based on a degree of relationship of the phrases, and a hierarchical structure is generated, the hierarchical structure comprising a plurality of maps, each map corresponding to a predetermined degree of relationship, the map graphically depicting the clusters at the predetermined degree of relationship, and comprising a plurality of nodes, each node representing a cluster, and a plurality of links connecting nodes that are related. The map is displayed to a user, a user selects a particular cluster on the map, and a portion of text is extracted from the pieces of text based on the cluster selected by the user.

U.S. Pat. No. 5,991,751 System, method, and computer program product for patent-centric teaches a system, method, and computer program product for processing data are described herein. The system maintains first databases of patents, and second databases of non-patent information of interest to a corporate entity. The system also maintains one or more groups. Each of the groups comprises any number of the patents from the first databases. The system, upon receiving appropriate operator commands, automatically processes the patents in one of the groups in conjunction with non-patent information from the second databases. Accordingly, the system performs patent-centric and group-oriented processing of data. A group can also include any number of non-patent documents. The groups may be product based, person based, corporate entity based, or user-defined. Other types of groups are also covered, such as temporary groups.

U.S. Pat. No. 6,298,327 Expert support system for authoring invention disclosures teaches a computer-implemented expert support system for authoring invention disclosures and for evaluating the probable patentability and marketability of a disclosed invention. The system comprises at least a computer, an input device, an output device, and software program. The software program is developed with an object-oriented design process and is implemented in an object-oriented computer language such as C++. The system facilitates communication of invention characteristics and enables output of invention disclosures in a plurality of formats, including that of a patent application.

U.S. Pat. No. 6,363,378 Ranking of query feedback terms in an information retrieval system teaches an information retrieval system processes user input queries, and identifies query feedback, including ranking the query feedback, to facilitate the user in re-formatting a new query. A knowledge base, which comprises a plurality of nodes depicting terminological concepts, is arranged to reflect conceptual proximity among the nodes. The information retrieval system processes the queries, identifies topics related to the query as well as query feedback terms, and then links both the topics and feedback terms to nodes of the knowledge base with corresponding terminological concepts. At least one focal node is selected from the knowledge base based on the topics to determine a conceptual proximity between the focal node and the query feedback nodes. The query feedback terms are ranked based on conceptual proximity to the focal node. A content processing system that identifies themes from a corpus of documents for use in query feedback processing is also disclosed.

U.S. Pat. No. 6,452,613 System and method for an automated scoring tool for assessing new technologies teaches an apparatus and method for an automated invention submission and scoring tool for evaluating invention submissions. The system comprises a server system and a plurality of server systems. The server system presents submission questionnaires over a networked connection to submitters at user systems. The user completes the questionnaires, which are returned to the server system for processing. The server system processes the answers to provide a quantified evaluation of the submission based on patentability and at least one other parameter, such as impact or value. An evaluator at an evaluator system can view a presentation of the quantified assessment of the invention submission. The evaluator can also view the results of multiple invention submissions on a status overview page Links between the status overview page, individual questionnaires, and individual assessment presentations are provided.

U.S. Pat. No. 6,542,889 Methods and apparatus for similarity text search based on conceptual indexing teaches a method of performing a conceptual similarity search comprises the steps of: generating one or more conceptual word-chains from one or more documents to be used in the conceptual similarity search; building a conceptual index of documents with the one or more word-chains; and evaluating a similarity query using the conceptual index. The evaluating step preferably returns one or more of the closest documents resulting from the search; one or more matching word-chains in the one or more documents; and one or more matching topical words of the one or more documents.

U.S. Pat. No. 7,054,856 System for drawing patent map using technical field word and method discloses a system and a method for drawing a patent map using a technical field word are disclosed. In the system and the method, a word to be used for drawing a patent map is extracted by calculating weight values of significant words which are gotten by removing unnecessary words from patent data, and this extracted word is matched with a patent to draw the patent map.

U.S. patent application Ser. No. 11/697,447 Enhanced Patent Prior Art Search Engine teaches a search engine configured to search a database of documents and provide search results to an end user is described. The search engine may be configured to provide the end user with a list of synonyms for terms in the search query submitted by the end user and allow the end user to identify those synonyms which should be included in the search engine. Alternatively or additionally, the search engine may be configured to provide the end user with survey questions, the answers to which, may be used to further define the search query. The database may include notes and/or advertisements that are associated with specific documents in the database.

U.S. patent application Ser. No. 11/745,549 Systems and Methods for Analyzing Semantic Documents Over a Network teaches systems and methods for processing an intellectual property (IP) by providing an automated agent to execute one or more searches for a user to locate one or more documents relating to an IP interest, the agent accessing a user profile to determine the user's IP interest and identifying one or more IP documents each having a tag responsive to the IP interest; ranking one or more documents located by the automated agent; and displaying the one or more documents located by the automated agent.

U.S. patent application Ser. No. 11/809,455 Concept based cross media indexing and retrieval of speech teaches indexing, searching, and retrieving the content of speech documents (including but not limited to recorded books, audio broadcasts, recorded conversations) is accomplished by finding and retrieving speech documents that are related to a query term at a conceptual level, even if the speech documents does not contain the spoken (or textual) query terms. Concept-based cross-media information retrieval is used. A term-phoneme/document matrix is constructed from a training set of documents. Documents are then added to the matrix constructed from the training data. Singular Value Decomposition is used to compute a vector space from the term-phoneme/document matrix. The result is a lower-dimensional numerical space where term-phoneme and document vectors are related conceptually as nearest neighbors. A query engine computes a cosine value between the query vector and all other vectors in the space and returns a list of those term-phonemes and/or documents with the highest cosine value.

U.S. patent application Ser. No. 11/812,135 System and method for analyzing patent value, teaches at least one exemplary embodiment discloses a system, computer program product and method for evaluating the value of a legal document such as a patent-related document. In accordance with at least one exemplary embodiment, a Latent Semantic Analysis ("LSA") search engine can search a database of patent-related documents to identify an "N" number of patent-related documents deemed thereby as relevant to a target document and indices of the target patent-related document can be compared and scored against the indices of the relevant identified patent-related documents. At least one exemplary embodiment evaluates a plurality of indices of patent-related document value using legal, commercial and/or technological factors.

SUMMARY OF THE INVENTION

According to an aspect of some embodiments of the present invention there is provided a methodology that uses the search and Examination reports provided by a patent Examining authority as a learning database to train a search engine to learn relationships between scientific and technological concepts. Trained using such a learning database, the search engine is then able to carry out meaningful searches, not just of the patent literature but of technological and scientific literature in general.

According to an aspect of some embodiments of the present invention there is provided a search engine for searching based on related scientific or technological concepts, comprising:

a learning module for learning about relationships between technical phrases based on their rates of occurrence in related documents, therefrom to form concepts from groupings of related phrases, and a search module for searching for related documents to a query document based on occurrence in the related documents of concepts present in the query document, the learning module carrying out the learning based on a training set of documents and inter-document relations.

In an embodiment, the training set comprises expert-provided links to indicate related documents.

In an embodiment, the learning module is configured to quantify a relatedness of a concept to an individual document based on the occurrence within the individual document of the technical phrases grouped within the concept.

In an embodiment, the learning module is configured to quantify a relationship between two documents based on a number of concepts having a relatively high relatedness in common between the two documents, the quantifying being usable with a threshold to indicate related documents.

In an embodiment, the learning module is configured to identify the technical phrases in all documents of the training set and to calculate rates of co-occurrence in related documents against rates of co-occurrence overall, therefrom to form the groupings.

In an embodiment, the learning module is configured to identify the technical phrases in all documents of the training set and to calculate rates of co-occurrence in respectively related documents against rates of co-occurrence overall, therefrom to form the groupings.

In an embodiment, the training set comprises a set of patent documents and the inter-document relations comprise derivations from patent examination documentation.

In an embodiment, the learning module comprises document analysis capability to relate two patent documents on the basis of patentability findings recorded in the patent examination documentation.

In an embodiment, the patent examination documentation comprises a patent examination report on a first of the documents and wherein the identification of technical phrases is based on a version of the first document to which the patent examination report relates.

In an embodiment, the patent examination report is analyzed to identify rejections or objections and to identify references to other patent applications that provide the basis of the rejections or objections.

In an embodiment, the learning module comprises a technical phrase identification unit for identifying the technical phrases appearing in the training set.

In an embodiment, the search module is configured to rank target documents against a query document on the basis of occurrence in respective target documents of technical phrases belonging to ones of the concepts found in the query document.

According to a second aspect of the present invention there is provided a method of searching patent literature comprising:

obtaining a training set of patent literature comprising patent applications and corresponding patent office reports;

using the patent office reports to group certain patent applications together as related patent applications;

grouping technical terms together as related terms if they appear more often in related patent applications than in the training set as a whole; and searching technical literature using respectively related terms.

According to a third aspect of the present invention there is provided a search method for searching based on related scientific or technological concepts, comprising:

learning about relationships between technical phrases based on their rates of occurrence in related documents of a training set, thereby forming concepts of related phrases, and searching for related documents to a query document based on occurrence of concepts present in the query document.

In an embodiment, the training set comprises expert-provided links to indicate related documents.

In an embodiment, the learning comprises identifying the technical phrases in all documents of the training set and calculating rates of co-occurrence in related documents against rates of co-occurrence overall, therefrom to form the groupings.

In an embodiment, the training set comprises a set of patent documents and the inter-document relations comprise derivations from patent examination documentation.

In an embodiment, the learning comprises document analysis to relate two patent documents on the basis of patentability findings recorded in the patent examination documentation.

In an embodiment, the learning comprises a stage of technical phrase identification for identifying the technical phrases appearing in the training set.

In an embodiment, the search comprises ranking target documents against a query document on the basis of occurrence in respective target documents of technical phrases belonging to ones of the concepts found in the query document.

The search method may comprise calculating a metric between a query document and a target document, the metric being usable in identifying a utilization risk.

In an embodiment, the search for related documents is carried out on available technical literature.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a graph of patent filings year on year from 1985 to 1986 indicating a consistent trend of growth in the long term;

FIG. 2 is a graph of patent filings at different patent offices over a hundred year period;

FIG. 3 is a simplified block diagram showing conceptual details of a search engine with a learning module and a search module, according to an embodiment of the present invention;

FIG. 4 is a simplified block diagram showing components of the learning module of FIG. 3;

FIG. 5 is a simplified diagram showing a flow chart of the learning phase of the search engine of FIG. 3;

FIG. 6 is a simplified flow chart illustrating the search phase of the search engine of FIG. 3;

FIG. 7 is a diagram illustrating how the relationships between documents analyzed may lead to a training set of concepts;

FIG. 8 is a diagram illustrating concepts of relatedness over documents and their quantification according to an embodiment of the present invention;

FIG. 9 illustrates the flow of FIG. 5 in greater detail;

FIG. 10 illustrates part of the flow of FIG. 9 in greater detail;

FIG. 11 is a flow chart illustrating searching using the quantities determined in FIGS. 9 and 10;

Figure 1:
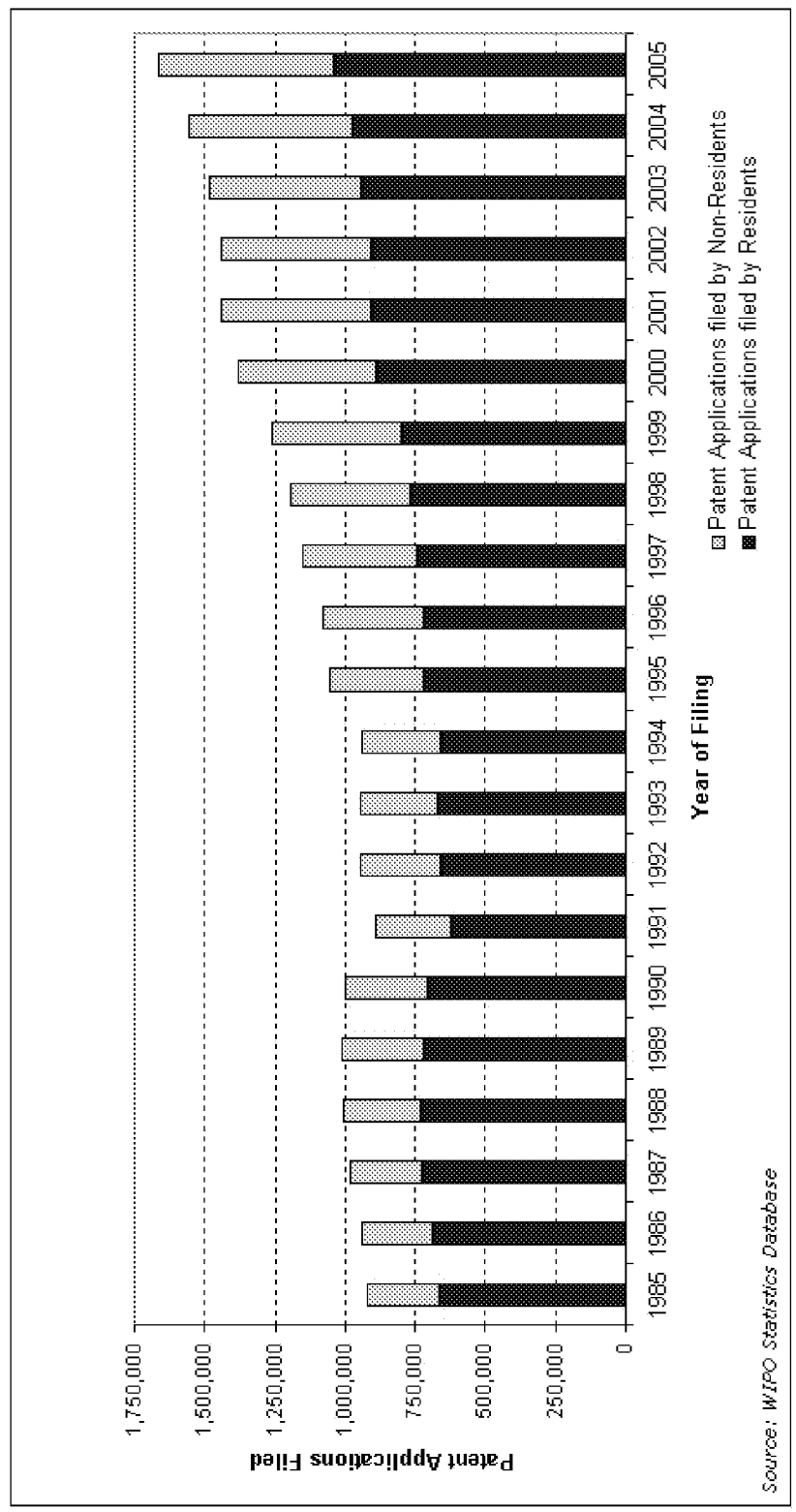
Figure 12:
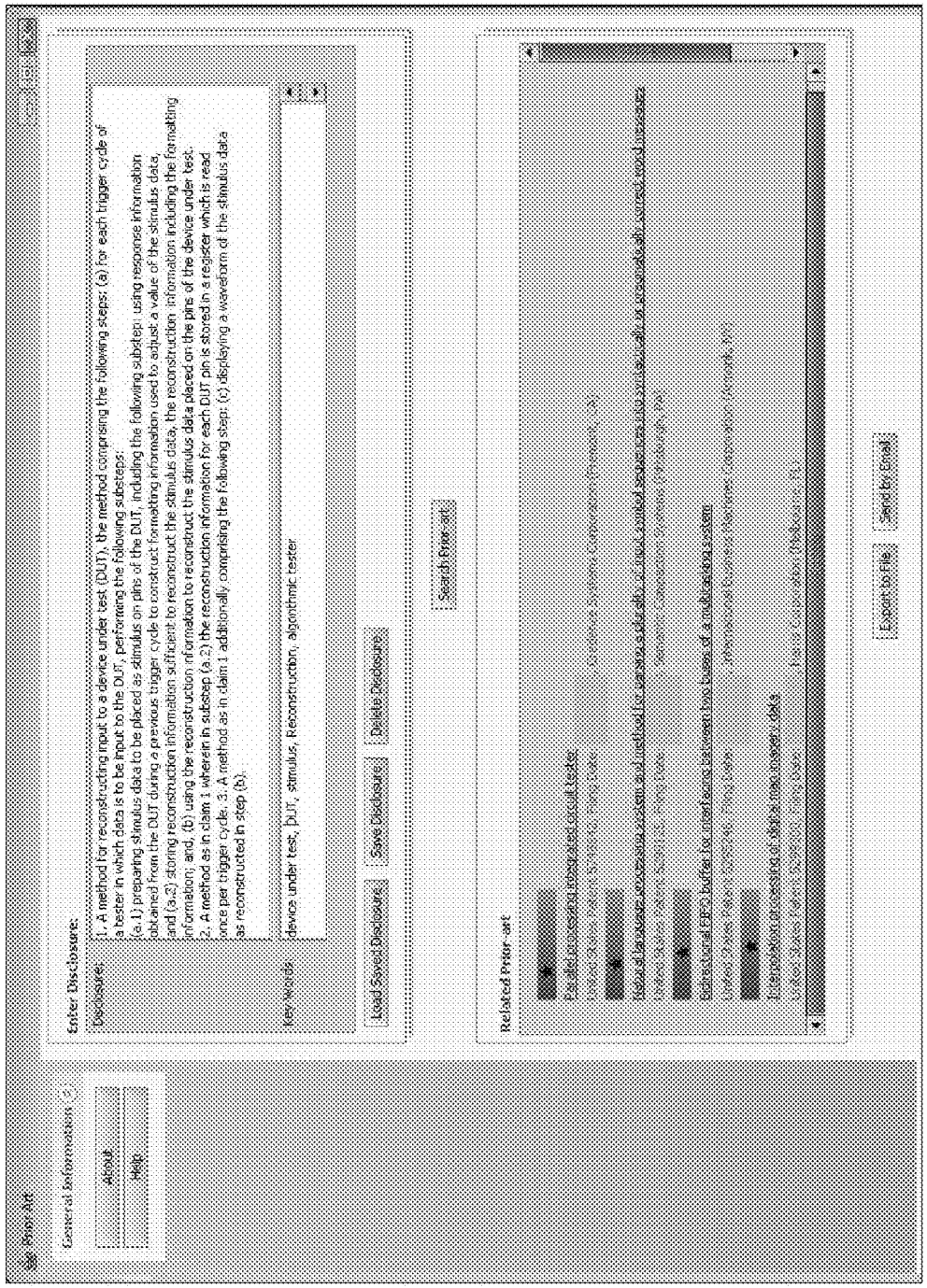
Figure 18:
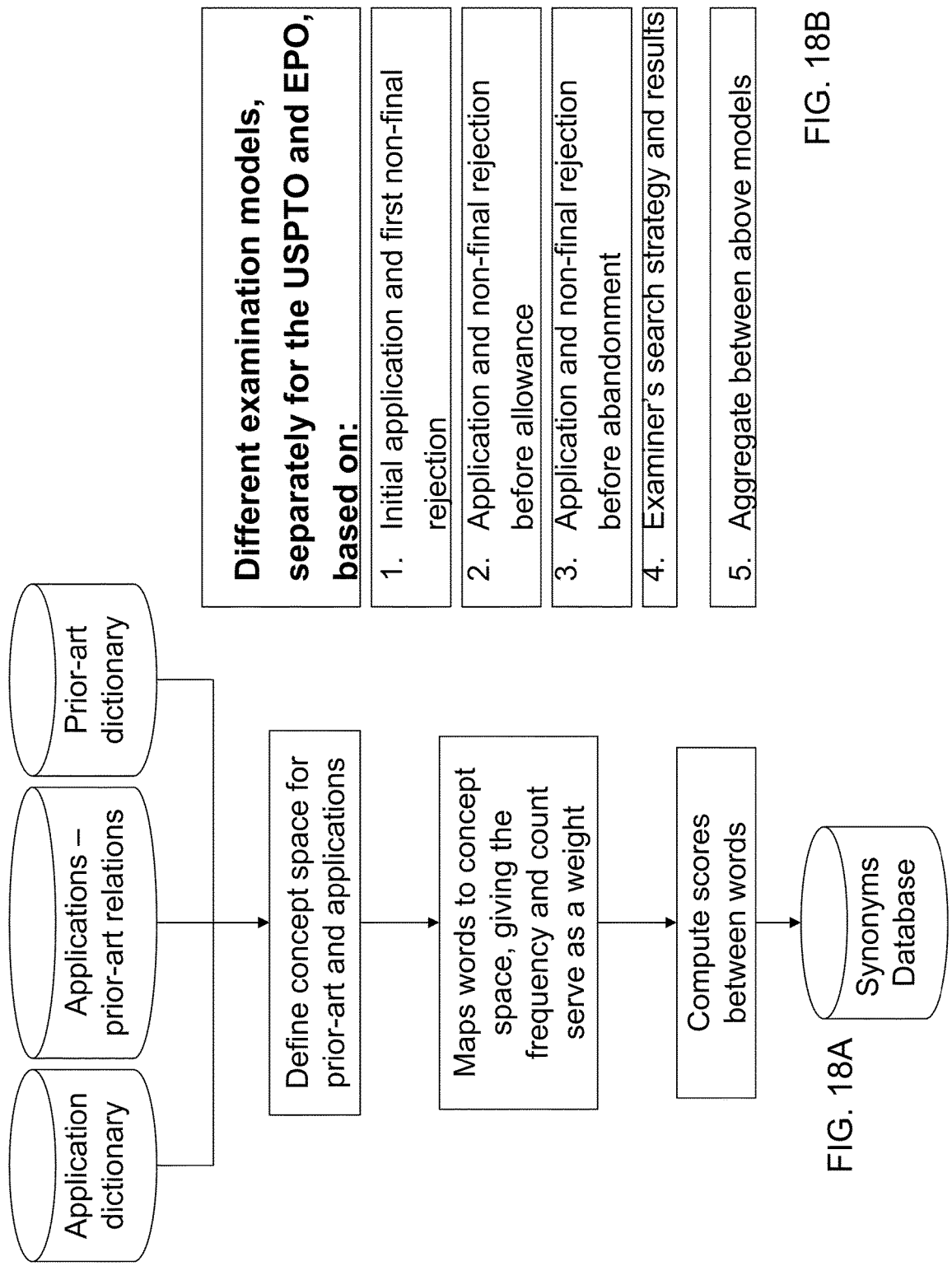
Figure 19:
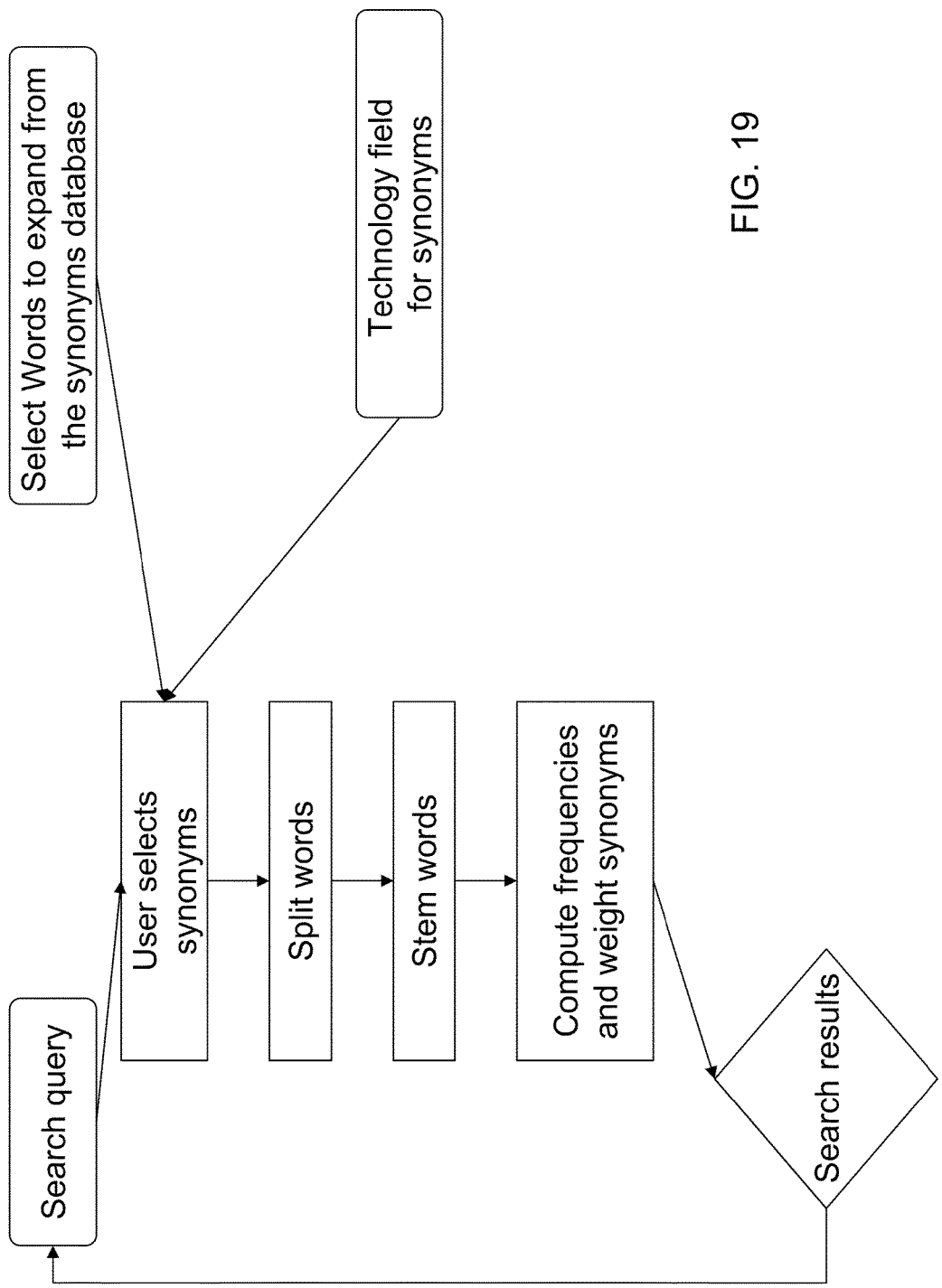

FIG. 12 illustrates a user interface to the search engine of FIG. 1;

FIGS. 13-17 are graphs of results of experiments in which concept searching according to the present embodiments is compared to textual searching of the prior art;

FIG. 18A is a flow chart showing a procedure for providing a concept space for a patent document to be searched and mapping words including synonyms of the concept words to that space according to a preferred embodiment of the present invention;

FIG. 18B illustrates a series of models for extracting terms to construct the concept space; and FIG. 19 is a detail of FIG. 18A illustrating a possible method for synonym selection.

DESCRIPTION OF EMBODIMENTS OF THE INVENTION

The present invention, in some embodiments thereof, relates to a search engine and methodology and, more particularly, but not exclusively, to such a search engine and methodology particularly applicable to patent literature.

The present methodology may use the search and Examination reports provided by a patent Examining authority as a learning database to train a search engine to learn relationships between scientific and technological concepts. Trained using such a learning database, the search engine is then able to carry out meaningful searches, not just of the patent literature but of technological and scientific literature in general.

The methodology involves understanding the structure of documents such as search and Examination reports provided by the authority so that a relationship can be assumed between the claims of the examined patent or application which is the subject of the report and the text of the patent or application cited against it in the report. The assumed relationship is then used to assign interdependencies to phrases that appear in both documents. As the above process is carried out over hundreds and thousands of documents, a database is built up of probabilities of two phrases being related.

After the learning stage, the database can then be used in searching to rank relationships between documents so that documents bearing closely related subject matter are ranked highly in the search results. The patent search stage thus indicates semantic relationships and is freed from dependence on the need for identical keywords.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
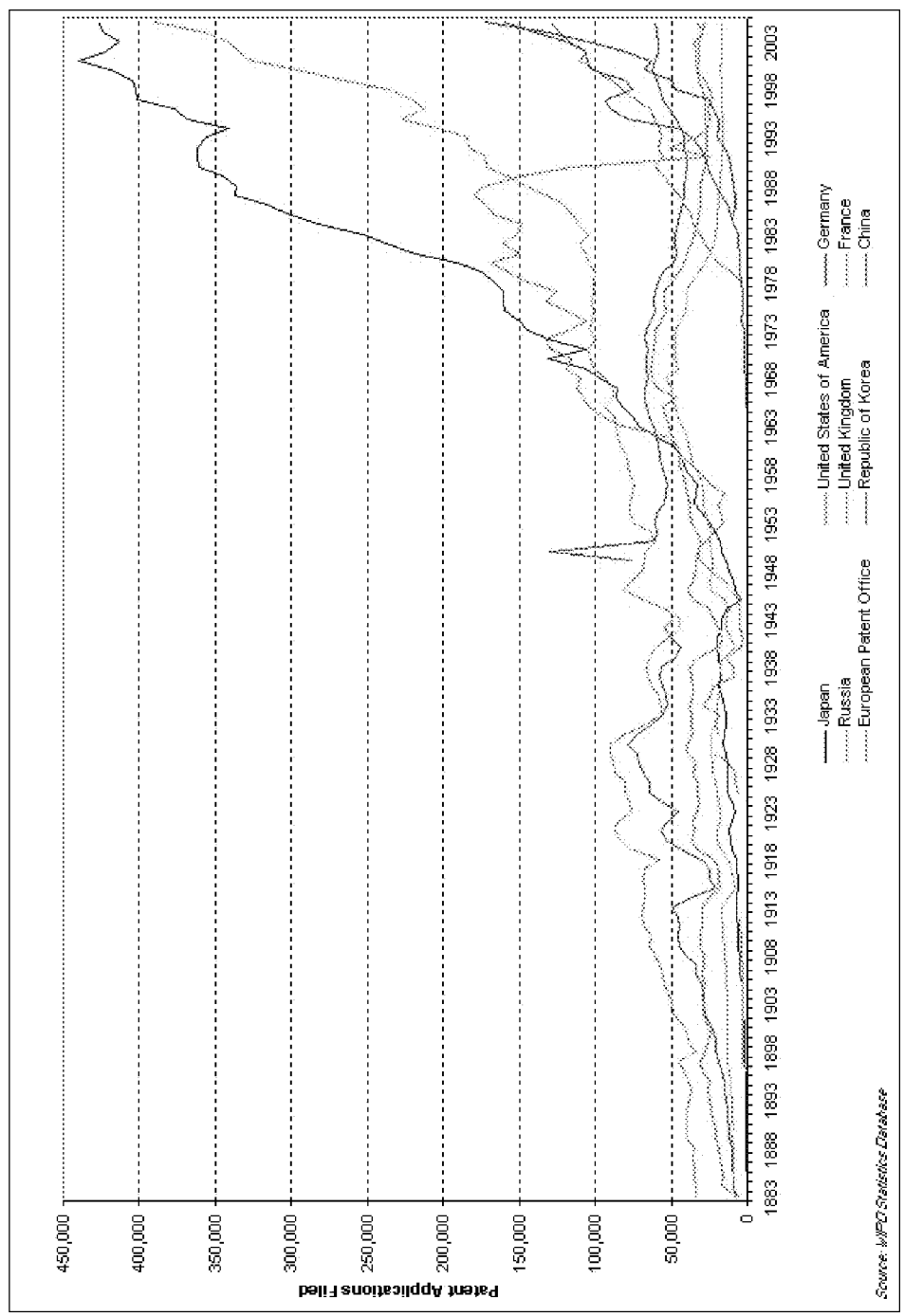

Referring now to the drawings, FIGS. 1 and 2 were referred to in the background.

Figure 3:
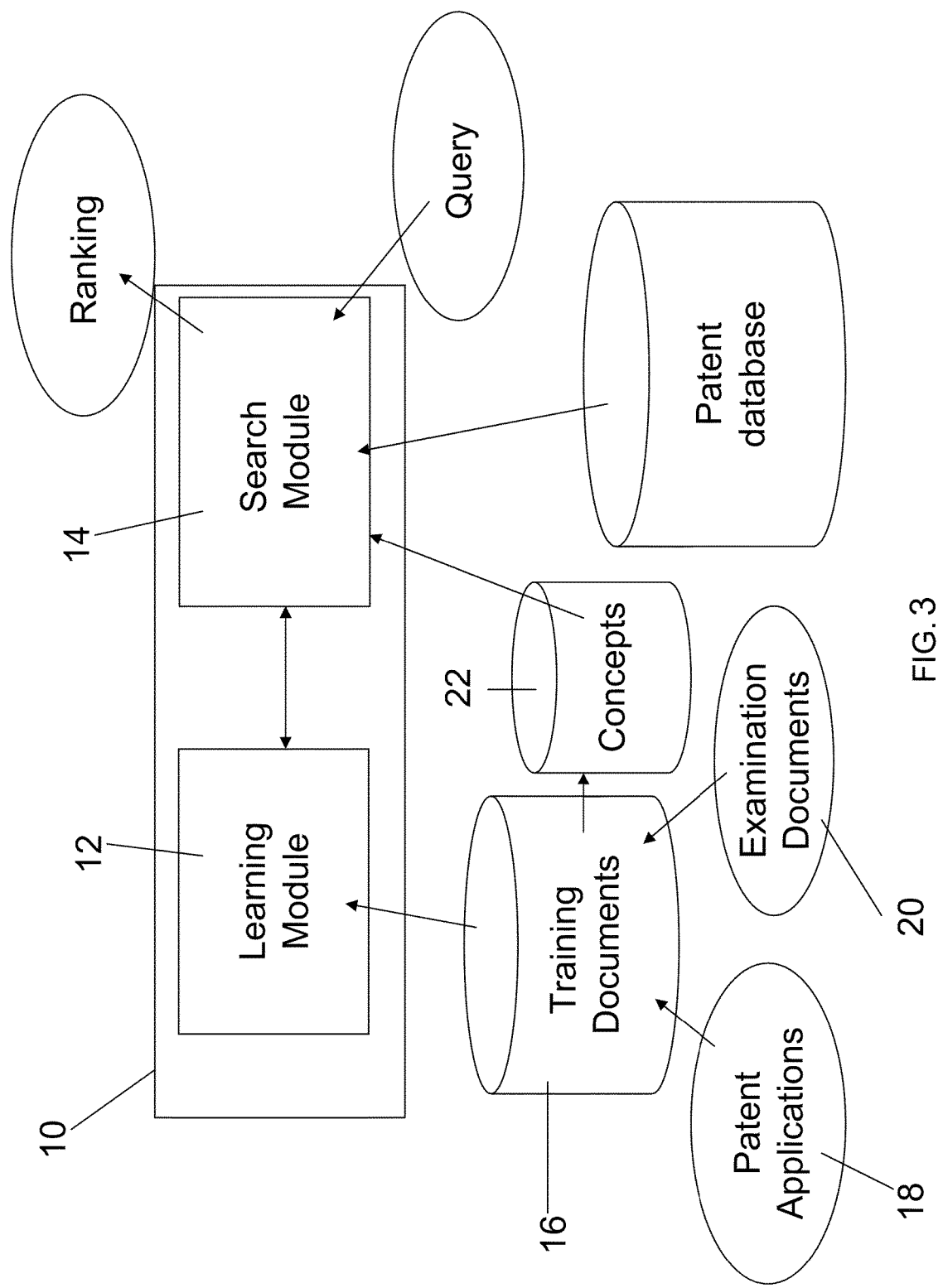

FIG. 3 is a simplified block diagram illustrating a conceptual embodiment of the present invention. A search engine 10 for preparing a database and then searching based on related scientific or technological concepts, comprises a learning module 12 and a search module 14.

The learning module 12 learns about relationships between technical phrases based on their rates of occurrence in related documents and groups concepts together on that basis. More particularly a ratio is obtained when the rate of co-occurrence in related documents is compared to the background rate of co-occurrence as will be explained in greater detail below. If the rate of occurrence in the related documents is higher than the background rate, that is to say the ratio is positive, the two technical phrases may be linked together to form a concept, that is to say a grouping of related phrases. In one embodiment, the connection may be an absolute yes/no connection, where a connection is made whenever the ratio exceeds a predetermined threshold. Alternatively a relative connection may be defined based on the actual proportion obtained. The ratio may be calculated from a training documents database 16 of technical documents and a listing of which documents are related to which other documents.

As will be explained in greater detail below the listing of which documents are related to which other documents may be provided by experts in the field. As will be noted the patent literature is of particular interest in this regard as patents are examined and the examination documents, provided by patent examiners who are experts specializing in the relevant fields may serve as the expert input to define the initial relationships. Thus the training set 16 comprises two components, patent application literature 18 which provides the technical literature itself, and patent examination documents 20 which comprise expert-provided linking, indicating which patent applications are related to which other patent applications.

Search module 14 then uses the concepts found by the learning module—training set 22. When presented with a query document it looks for the technical phrases and then searches for the phrases themselves or those other phrases that have been allied to them as concepts in the learning mode. The target documents are then ranked according to the occurrence of the technical phrases belonging to the concepts and some or all of the ranked documents are presented to the user.

Figure 4:
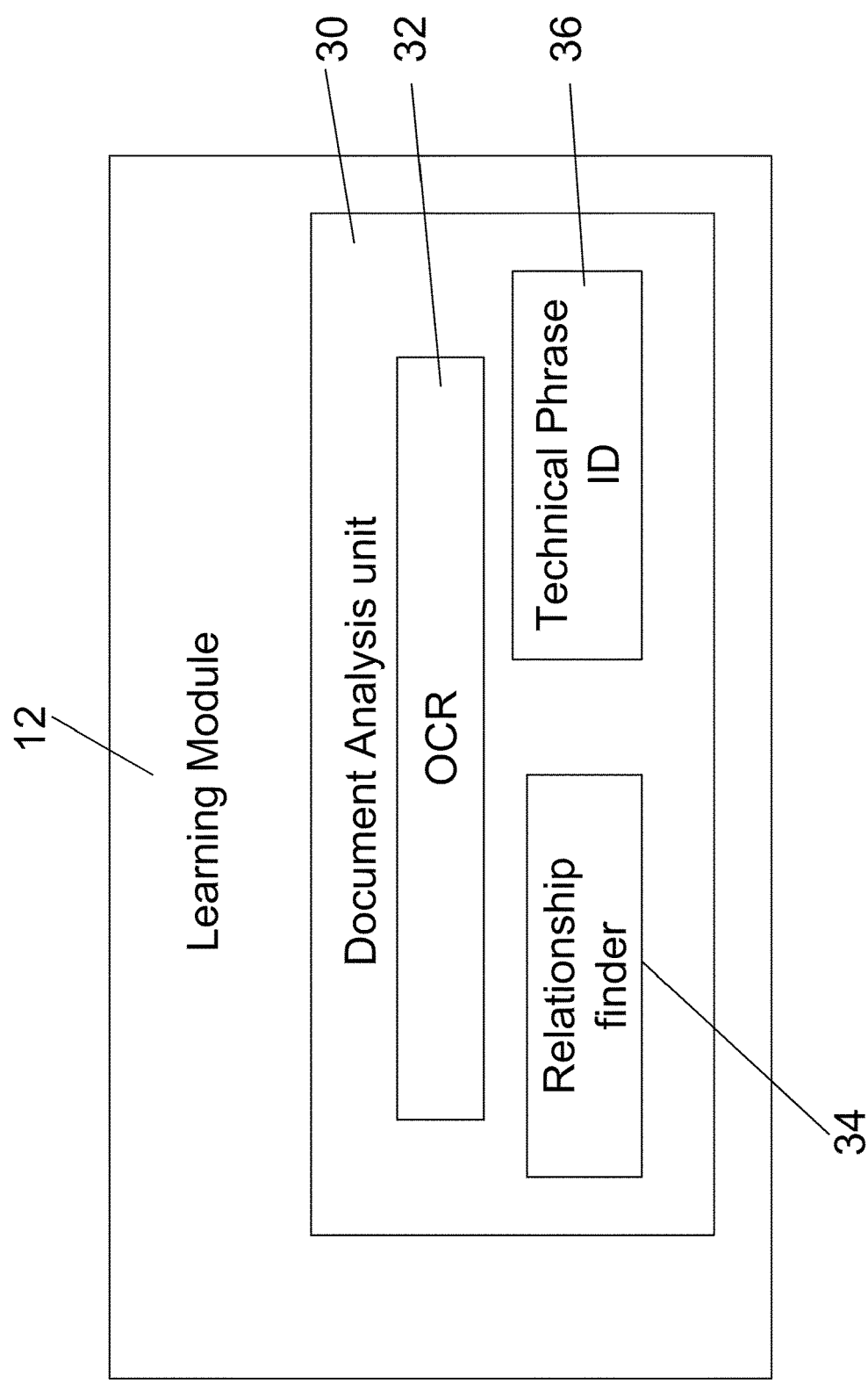

Reference is now made to FIG. 4, which shows learning module 12 in greater detail. The learning module 12 comprises document analysis unit 30 to analyze both the patent examination literature and the patent application literature.

Document analysis unit comprises an optical character recognition (OCR) unit 32 which reads the document text from the images typically available on the Internet. Relationship finder unit 34 then analyzes the patent examination literature to identify from the text of the examination document the related documents being pointed to by the Examiner. The patent examination literature tends to follow particular formalities in identifying these documents so that the analysis capability required by the learning module is made easier. The analysis will be discussed in greater detail below.

The document analysis unit may further include a technical phrase identification unit 36 for identifying the technical phrases appearing in the training set of patent application documents.

Figure 5:
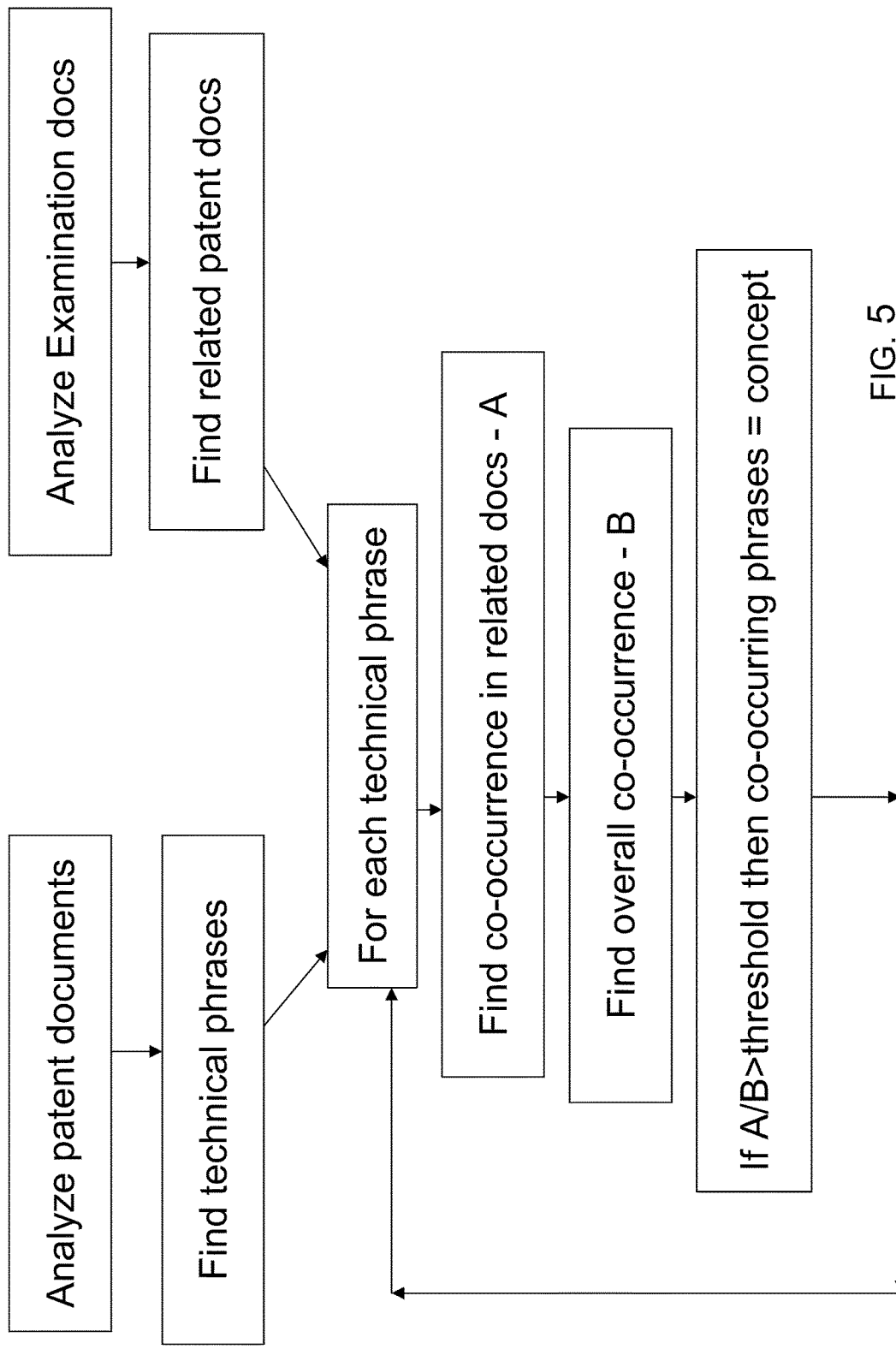

The document analysis process after OCR is shown in the flow chart of FIG. 5, to which reference is now made. As shown in FIG. 5, the analysis of the patent application documents finds technical phrases, so that each patent application document is reduced to a series of technical phrases. The patent examination documents are then analyzed to find the related patent documents.

Then, each technical phrase is taken in turn and tested for co-occurrence with other technical phrases in other documents. The co-occurrence in related documents is denoted A, and the co-occurrence over documents overall is denoted B. The ratio of A/B is tested, for example against a threshold, and if the test proves positive then the two technical phrases are consigned to a single concept.

Figure 6:
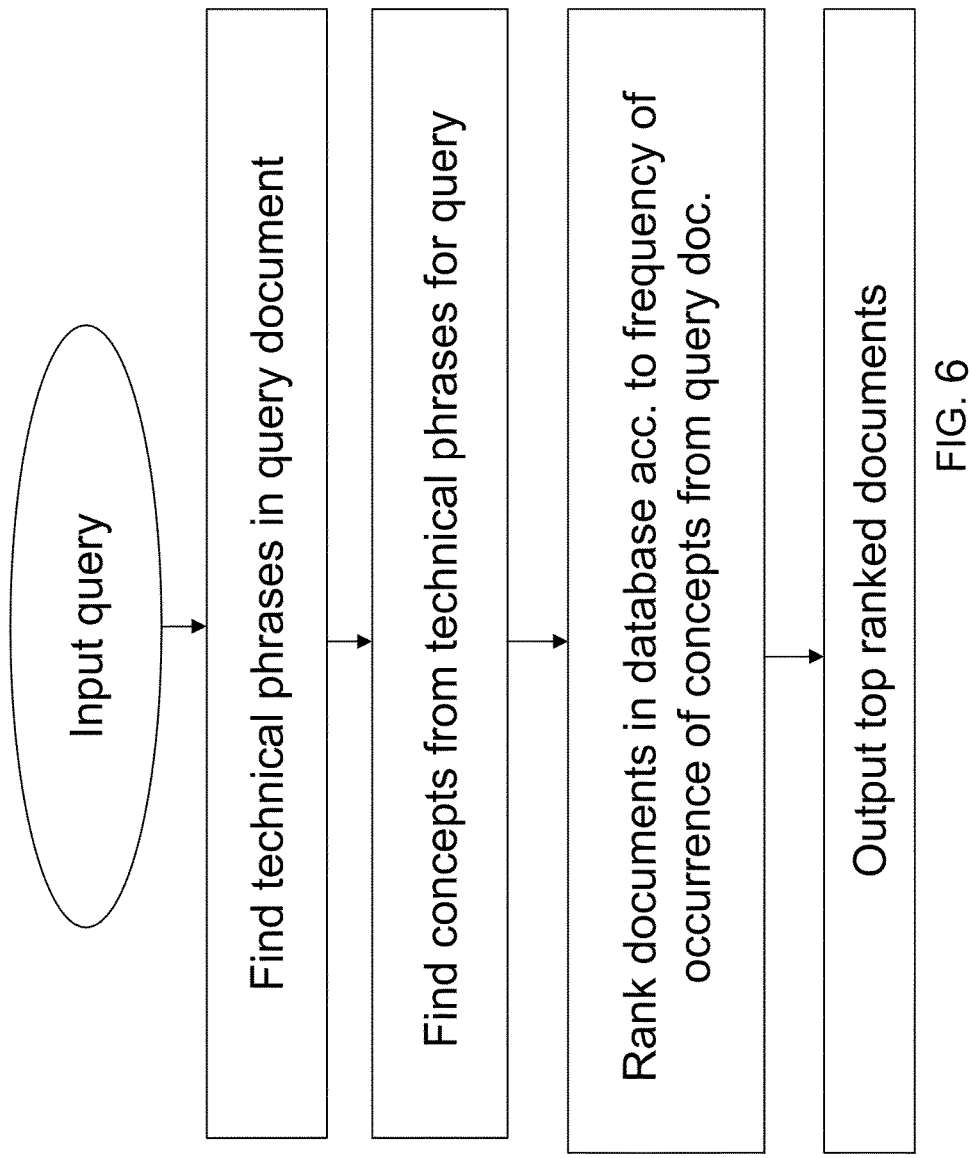

Reference is now made to FIG. 6, which is a simplified diagram illustrating the flow of a search procedure using the concepts obtained in FIG. 5. A document is input as an initial query by the user. The document has its own technical phrases which are extracted. The technical phrases that are extracted may or may not belong to concepts identified in the training stage. Where they do, all the technical phrases of the concepts are used to formulate a search query for actual use. The search query then ranks the documents in the database according to frequency of occurrence of the technical phrases from the identified concepts.

For technical phrases that are not part of extended concepts, the individual technical phrases may simply be added as they are to the search query, or may be ignored, as preferred by the skilled user.

The search module thus ranks target documents against a query document on the basis of occurrence in the different target documents of the various technical phrases belonging to the different concepts found in the query document.

As explained, the present embodiments provide an approach to evaluate the scientific relatedness of patent documents. The approach uses training-set 22 of related scientific concepts to compute the scientific similarity of different patent documents. This training-set links together different scientific concepts, through external information about their scientific relatedness, and is formed in the training process referred to above.

The training-set includes thousands of search and examination reports by patent examiners from a patent examining authority, for example the United States Patent and Trademarks Office and the European Patent Office. These reports are analyzed, automatically and manually, to retrieve information about the relatedness of scientific documents as determined by the patent Examiners, who are experienced and trained experts specializing in the particular technology field. In addition to the examiner search reports dataset, one may use the original pre-rejection patent applications to which the reports refer. The combination allows one to tie together scientific concepts from the patent application to the prior-art in a manner that is not merely based on keyword similarity, but on meaning as interpreted in the professional opinion of highly-trained scientists.

In the past decade automated content-based search engines, known as information retrieval, have gained major popularity in academic and business applications. Models of information retrieval, IR, examine the relation between documents, as inferred from the textual features of each document. A common technique is the vector space model, also known as bag-of-words representation. According to this technique, each document is represented by an index vector of features, usually words that appear or are related to the document. Features are usually weighted, where the weight increases with the ratio between the frequency at which the features appear in the document, and the frequency they appear in all other documents. The relatedness of a document is then computed based on the similarity of the weighted bag-of-words representation of each document.

Learning about the conceptual meaning of documents is also known as Text Categorization (TC)—the assignment of natural language texts to one or more predefined categories based on their content. Text categorization aims to classify documents to a pre-determined set of labels, where each label is associated with the set of words used in the document. Each document is presented as a collection of representative items that could be manipulated mathematically. The classification into categories and concepts is then based on the degree of similarity of the representative vectors.

The question facing experts in the field of information retrieval is how to learn about the content relatedness of documents based on their textual characteristics. Semantic similarity is the simplest technique used to measure the relatedness of documents (Baeza-Yates and Ribeiro-Neto, 1999): the only criterion used to evaluate the relatedness of documents is the extent of overlap between the words used in each document (each word is usually weighted by the relative frequency the word is used in the document and in all other documents). There are two main drawbacks to the bag-of-words approach: (1) its high dimensionality in terms of textual features and (2) its complete reliance on exact textual overlap.

More advanced algorithms belong to the LSA family. The LSA approach reduces the dimensionality of the bag-of-words by forming vectors of representative concepts using techniques from linear algebra. Other attempts to improve the bag-of-words by reducing its dimensionality includes the n-gram approach and statistical and linguistic models. The LSA approach notes that it is highly common in patent documents that words appear in clusters of technical phrases (see examples above). Thus, in addition to regular words that appear in patent documents, one may according to the LSA approach also examine word clusters independently of their individual terms in evaluating conceptual relatedness.

In contrast to reducing word dimensionality, feature generation techniques expands the bag-of-words for using background words from exogenous sources. For example, Sahami and Heilman (2006) propose comparing short documents by sending a query based on the textual features of the documents to a web search engine and then compute the similarity between the vectors of words retrieved from the web for each query. Along this line, Strube and Ponzetto (2006) and Gabrilovich and Markovitch, (2007) export information from Wikipedia for the set of words that appear in the query, aiming to introduce additional background words that would shed light on the conceptual meaning of the words in the original document. Similar to the LSA, a central limitation is the lack of information about conceptual relatedness of words and technical phrases.

Different techniques examine the relation between documents using training-sets and machine learning algorithms. Machine learning techniques have been developed and implemented on information retrieval tasks: transfer learning and semi-supervised learning, EM algorithms, latent semantic kernels and generalized vector space model. Machine learning algorithms are used to approximate the function that maps the textual features of the document to the document's classification. Such approximation is performed using a training-set which includes documents for which their classification is known in advance. It is usually the case that the training-set is assembled by a professional individual, an expert. Then, machine learning techniques are implemented to learn about the textual links between classified documents to form a mapping function between documents and categories to be used to classify documents outside the training-set automatically.

Forming a training-set that systematically covers the conceptual meaning of natural language is an extremely complicated task. One example of such a training-set is WordNet, which is a special dictionary that groups words into concepts. In addition to grouping words into concepts (Synsets), WordNet also provides information on the hierarchical relation between concepts. Based on this hierarchical relation numerous techniques were developed to measure the conceptual relatedness of words. The development of WordNet was mostly manual and took about two decades. Its main drawback is still its relatively low coverage of words, and another drawback is the multiplicity of concepts that are assigned to single words.

The present embodiments are based on Expert Training-Set Machine Learning Systems [ETSM], where we learn about the scientific relatedness of documents from thousands of expert evaluation reports of related patent documents in a process of supervised learning.

The present embodiments provide a technical document search engine, and more particularly but not exclusively a patent document search engine. They build on a novel dataset that provides information on the scientific relation between words and technical phrases in patent documents. Unlike semantic similarity engines, the present embodiments do not compare the textual overlap of patent documents, but rather the to overlap in the scientific concepts they are likely to be associated with.

The present embodiments develop a machine learning system which is based on a training-set of scientifically related documents extracted from search reports of patent examiners from patent examining authorities such as the United States Patents and Trademarks Office (USPTO) and the European Patent Office (EPO). Search reports include unique information about distinct documents that represent a related or identical technology. When the patent examiner rejects a specific claim she has to provide an explanation for her rejection, where this explanation is usually a citation of a related prior-art document. Once the Examiner is able to relate a claim from the patent application to a prior-art document, a conceptual relationship may be assumed between the two documents involved. The conceptual relationship now includes the set of words used in the description of the rejected patent document and the set of words used in the description of the prior-art citation.

The present embodiments thus use the search and examination reports provided by the patent Examiners as a concept-linking knowledge base. The Examiners' reports, also known as non final rejections, used in the examples herein may be obtained directly over the Internet from the USPTO File Wrapper section that tracks and documents the patent application process. Only information from the initially filed patent application is regarded as valid for providing a training-set. Since claims are subsequently amended to differ from the prior art, the granted patents no longer express the same relationships. Thus one is less likely to learn about the different semantics used to describe the same invention from the texts of granted patents. On the other hand, during the patent application process the patent examiners specifically determine which claims are conceptually similar to relevant prior-art—and it is this Examiner determination which is the system's expert input, providing the source of identification of scientific relatedness.

In case of a rejection, the patent examiner indicates the number of the rejected claims and the reason for the rejection. The most common reasons for a rejection by USPTO examiners are novelty (102) and obviousness (103):

Rejection Under Paragraph 35 U.S.C. 102(b) or 102(e):

(b) the invention was patented or described in a printed publication in this or a foreign country or in public use or on sale in this country, more than one year prior to the date of application for patent in the United States.

(e) the invention was described in (1) an application for patent, published under section 122(b), by another filed in the United States before the invention by the applicant for patent or (2) a patent granted on an application for patent by another filed in the United States before the invention by the applicant forpatent, except that an international application filed under the treaty defined in section 351(a) shall have the effects for purposes of this subsection of an application filed in the United States only if the international application designated the United States and was published under Article 21(2) of such treaty in the English language.

Rejection Under Paragraph 35 U.S.C. 103(a):

A patent may not be obtained though the invention is not identically disclosed or described as set forth in section 102 of this title, if the differences between the subject matter sought to be patented and the prior-art are such that the subject matter as a whole would have been obvious at the time the invention was made to a person having ordinary skill in the art to which said subject matter pertains. Patentability shall not be negatived by the manner in which the invention was made.

In addition to the referenced prior-art, the patent examiner may provide detailed explanations about the different technical aspects in the application and prior-art that may have led to the rejection decision The combination of a rejected application and the prior-art cited by the patent examiner forms a conceptual relationship. This conceptual relationship is represented by its textual features, following the bag-of-words approach. A learning algorithm is then implemented to estimate the probability of observing the underlying concept, as a conditional probability based on textual representation.

Figure 7:
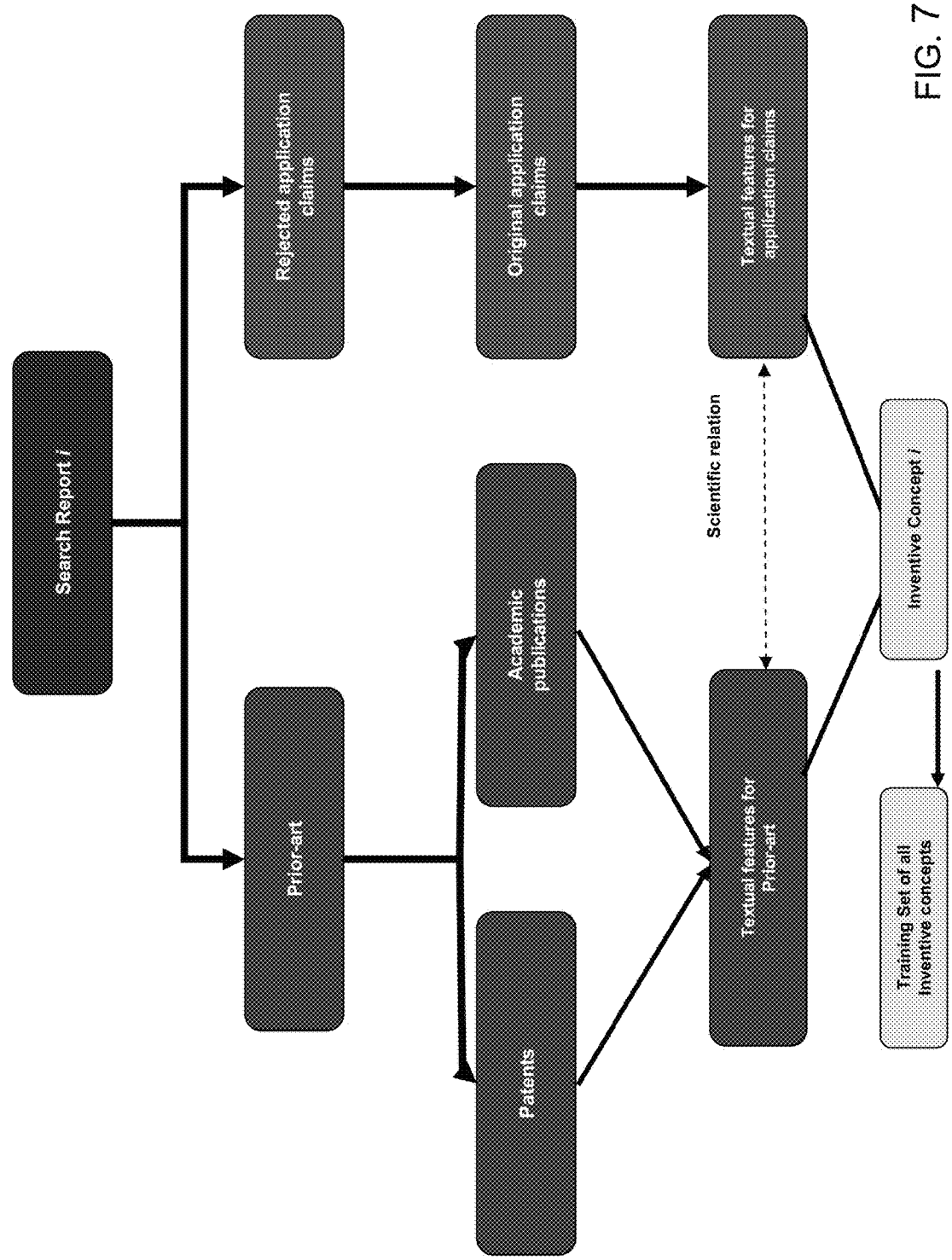

Reference is now made to FIG. 7, which is a simplified block diagram showing how a training set of concepts is derived from a Search or Examination report in combination with the text of the rejected application and the text of the prior art citation. The source of information for relatedness between patent documents is the Search or Examination Report provided by the Patent Examiners. From each report we identify the original claims that were rejected by the patent examiner and the cited prior-art. The combination of a rejected application and prior-art forms a concept.

Non-Final Rejections: Examples

The following are two examples for claim rejections from search reports of patent examiners for patent application Ser. No. 10/204,119 and patent application Ser. No. 09/451,127. The first example shows the rejection of two claims on the basis of novelty: these claims are already disclosed in U.S. Pat. No. 5,406,044. This means that the scientific content disclosed in the rejected claims is highly related to its prior-art. The second example shows the rejection on the basis of obviousness: the inventive step disclosed in the rejection over U.S. Pat. No. 5,764,485 is not significant enough to justify patentability. Thus, here as well, the technical content of the rejected claims is too similar to its prior-art.

TABLE 1

Extract from the Examination report (non-final rejection) of U.S. patent application No. 10/204,119. The application claim is rejected by the patent examiner on the grounds of lack of novelty - the invention disclosed in the claim has already been patented (U.S. Pat. No. 5,406,044). A conceptual relationship for this example includes the textual features of the original rejected claim and the textual features of the prior-art.

A section from the search report for U.S. patent application 10/204,119
Claim Rejections • 35 USC § 102

The following is a quotation of the appropriate paragraphs of 35 U.S.C. 102 that form the basis for the rejections under this section made in this Office action: A person shall be entitled to a patent unless - (b) the invention was patented or described in a printed publication in this or a foreign country or in public use or on sale in this country, more than one year prior to the date of application for patent in the United States.
Claims 1 and 2 are rejected under 35 U.S.C. 102(b) as being anticipated by Killian et al. (5,406,044). The patent to Killian et al. discloses a stud welding head, a linear drive, and an electromagnetic length measuring system. In regard to the "incremental length measuring system" language in claim 2, the system of Killian et al. is clearly capable of measuring incremental lengths and can thus be "defined" as an incremental measuring system. If applicant intends claim 2 to be directed to a length measuring system with incremental outputs, note that the system of Killian et al. is discloses, as being connectable to a computer. Such a digital connection would inherently involve incremental length measurement outputs since the analog output from element 34 would have to be converted to a digital number, thereby satisfying this interpretation of the claim language.

TABLE 2

This figure is from the Examination report (non-final rejection) of patent application No. 09/4581,127. The claim is rejected by the patent examiner on the grounds of obviousness - the invention disclosed in the claim is too similar to another patented invention (U.S. Pat. No. 5,764,485). A relational concept for this example includes the textual features of the original rejected claim and the textual features of the prior-art. A section from the search report for U.S. patent application 09/451,127

Claim Rejections • 35 USC § 103

The following is a quotation of 35 U.S.C. 103(a) which forms the basis for
all obviousness rejections set forth in this Office action:
(a) A patent may not be obtained though the invention is not identically disclosed or described as set forth in section 102 of this title, if the differences between the subject matter sought to be patented and the prior art are such that the subject matter as a whole would have been obvious at the time the invention was made to a person having ordinary skill in the art to which said subject matter pertains. Patentability shall not be negatived by the manner in which the invention was made.
Claim 1 is rejected under 35 U.S.C. 103(a) as being unpatentable over Lebaschi (U.S. Pat. No. 5,764,485).
Lebaschi discloses, a printed wiring board, comprising: a plurality of spaced apart circuit layers, being electrically connected by a blind hole/via wherein a surface contact pad is formed over the blind hole/via of an electrically conductive metallic layer. Although Lebaschi does not specifically state that the contact pad is formed by depositing over the blind hole/via, it would have been obvious, to one having ordinary skill in the art, at the time of invention to form the pad by depositing the material as this is a well known technique in the art.

Conceptual Relation Between Words and Technical Phrases

The present methodology forms links between words and technical phrases based on the frequency of their appearance in documents that have been classified to be technologically related by highly-trained field professionals (patent examiners). We define as concepts application-prior-art pairs, and it is noted that such concepts can include more than one application, if the same prior-art is used to reject more than one application. For each patent document outside the training-set we construct a weighted vector of concepts, where a concept that is more likely to be related to the patent receives a higher weight. The comparison between patent documents is performed on the basis of the degree of similarity of the vector of relational concepts they are likely to be associated with. Thus, different patents are assumed to be more technologically related if their predicted concept vectors exhibit greater similarity.

Figure 8:
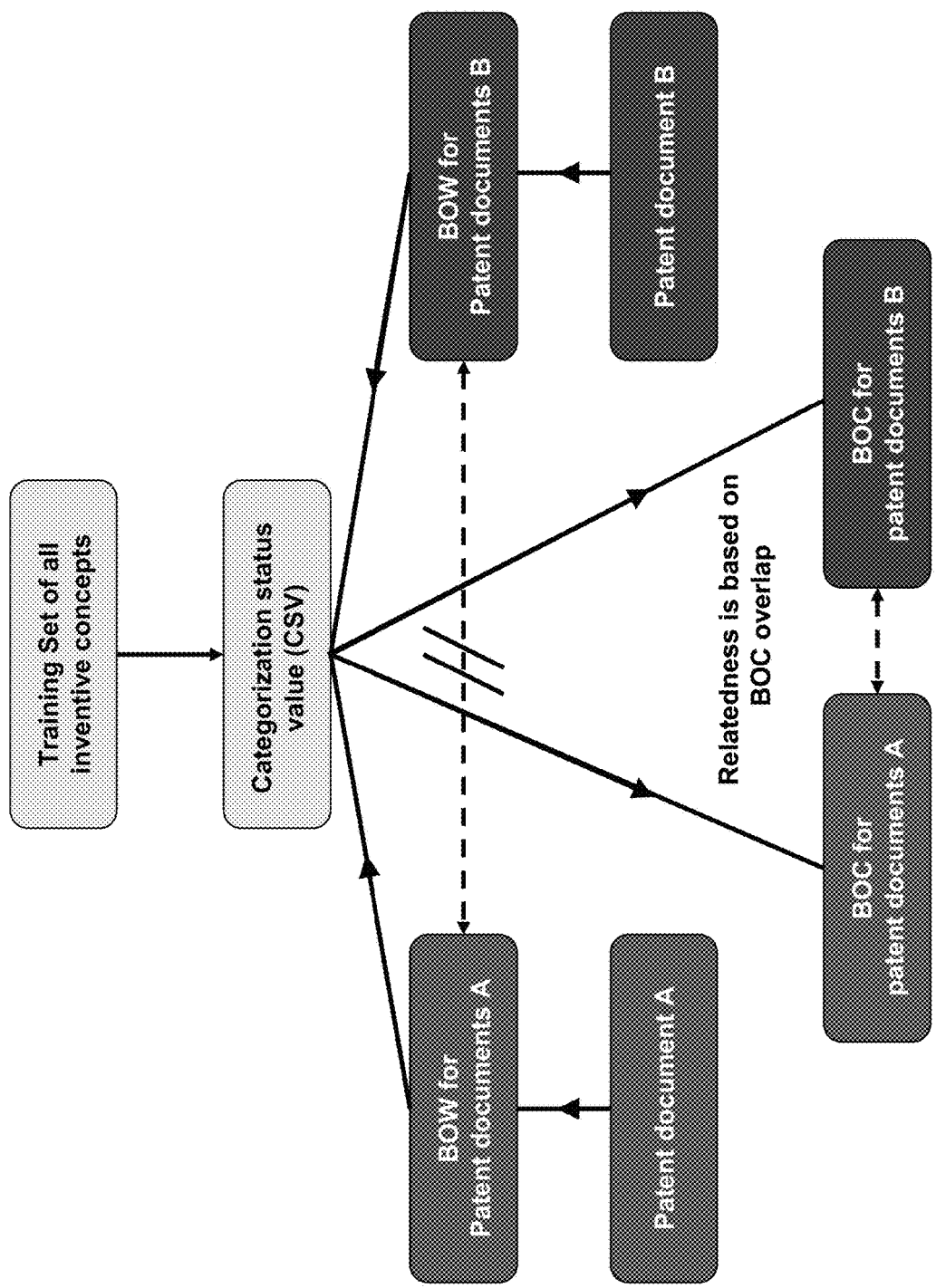

Before describing in detail the implementation and performance of an algorithm according to the present embodiments, we present an overview of the core procedure, as summarized in FIG. 9, which will be discussed in greater detail below. As shown in FIG. 8, the training-set includes all relational concepts. The training-set provides collections of words and collections of technologically related documents in which the words appear. The problem is to compute the conditional probability that concept i is associated with a new patent document j (outside the dataset), conditional on observing the word k, which appears in patent document j. The procedure is outlined in FIG. 10. Having computed the conditional probability for each concept-word pair, we turn to represent each patent document as a bag-of-concepts. Denote inventive concept i by $c_i$. Recall that the bag-of-words representation of $c_i$ includes all words that appear in the rejected claims and the prior-art. Each word in this vector is weighted, where the weights represent the information content the word provides as to which relational concept it is associated with. Based on the collection of words that represent each patent and the concept weights these words receive, concepts are assigned a categorization status value (CSV), as shown. The CSV represents the projection of the actual relatedness of documents from the training-sets to the textual features in each document. A higher CSV means the concept is more likely to be associated with the patent. More formally, the CSV can be defined as assigning a value for each pair, $\langle d_j, c \rangle \in D \times C$, where $d_j$ is a patent (outside the training-set), $c_i$ is a concept, D is the total number of patents in the database and C is the total number of concepts in the training-set.

Figure 10:
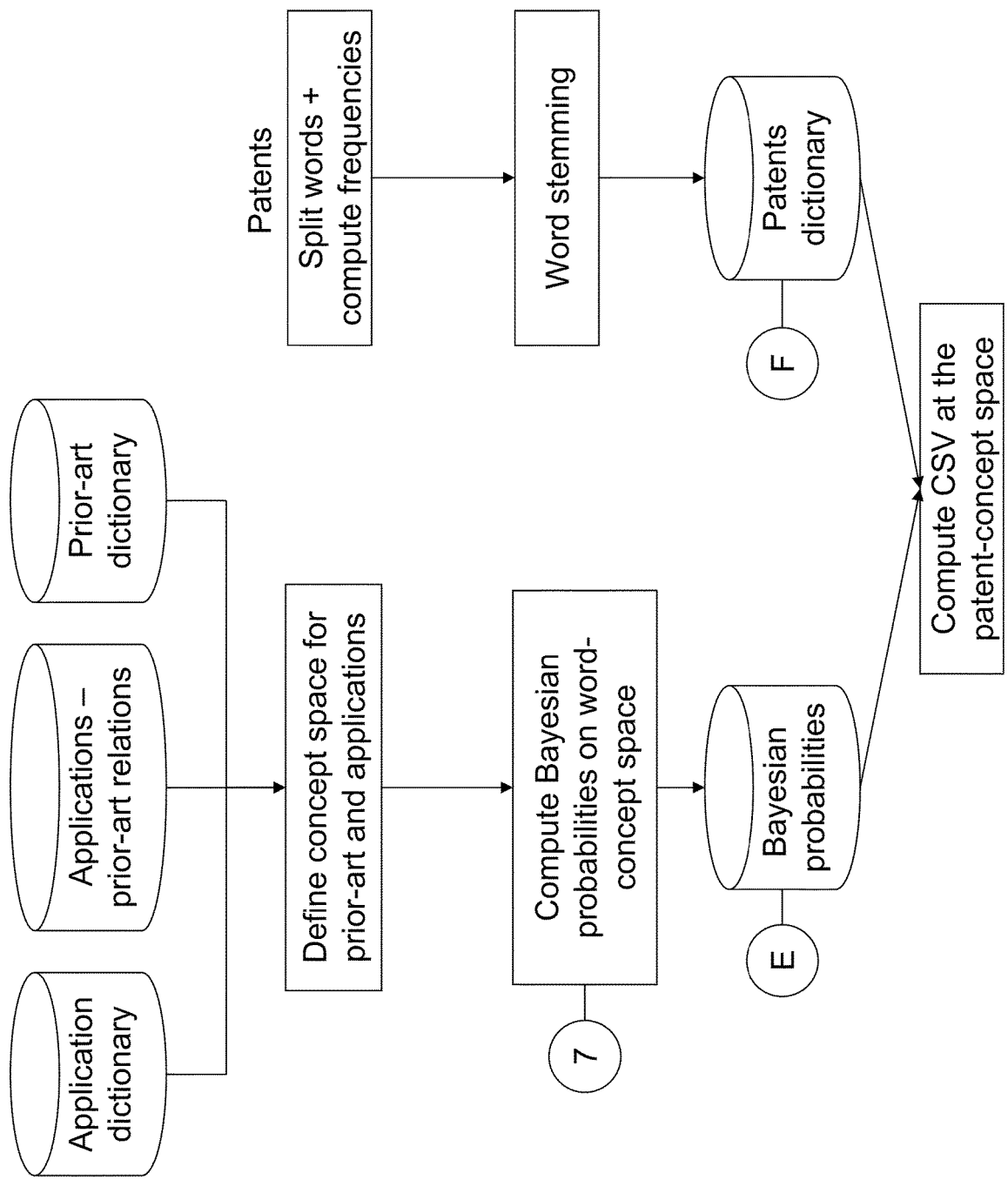

As shown in FIG. 10, the training-set includes pairs of rejected claims and related prior-art. For each document (outside the training-set) and concepts, we assign a categorization status value (CSV). The CSV represents the projection of the actual relatedness of documents from the training-sets on the textual features of the patent document. Patent pairs are assumed to have a stronger scientific relation, if their CSV vectors are more similar.

The various constituent parts are now considered in greater detail.

Constructing the Training-Set

The search algorithm of the present embodiments may use a set of technically-related documents from which we learn about scientific relatedness of words and technical phrases, and form a training set of concepts. The training-set is constructed from the patent applications themselves and interconnections between them as evaluated by professional patent Examiners. This section discusses in greater details the steps for constructing the training-set.

Stage 1: Preparation of Raw Documents

Figure 9:
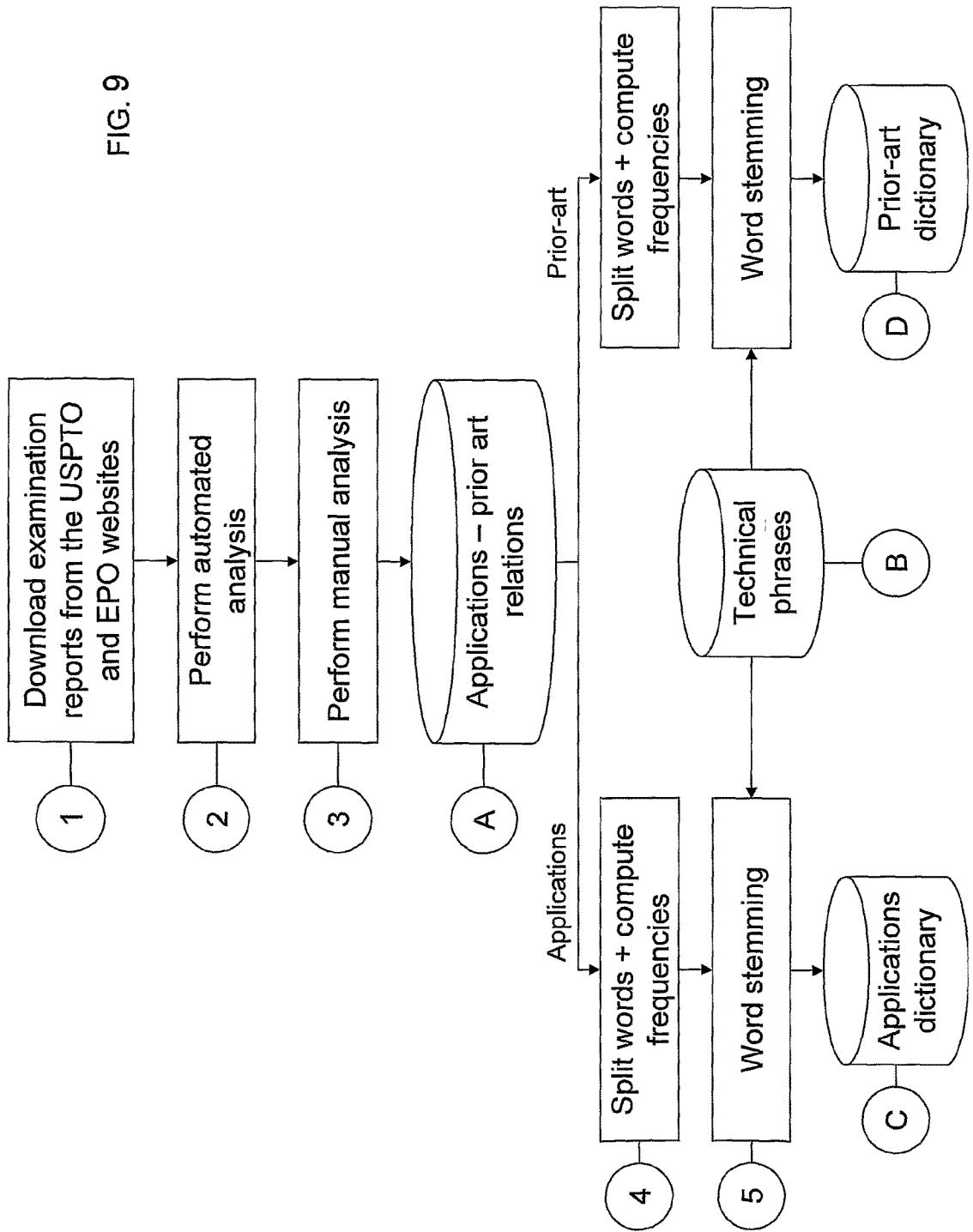

Referring now to FIG. 9, and as mentioned the algorithm uses information from the application process of patents submitted to the United States Patents and Trademarks Office (USPTO). An analogous methodology can be implemented for patents submitted to the European Patent Office (EPO).

I. Downloading Application Documents
   a. The examination reports, entitled non final rejection, are downloaded—stage 1—from the File Wrapper section of the USPTO. If there is more than one non-final rejection then the first is preferred.

b. The original application claims to which the examination reports refer are also downloaded from the File Wrapper section of the USPTO. The original claims do not include amendments made in response to objections, which may involve removal of crucial linking material.

II. Converting Documents From IMAGE to TXT Format a. The examination reports are scanned by the USPTO and are uploaded to the web as image files. A prerequisite to document analysis is therefore to convert all documents to a textual format such as PDF, using OCR software.

b. The application documents may then be converted from PDF format to TXT or like format.

c. The documents may then be split into two separate sections: rejections, which include the examination report, and claims, which include the claims of the initial application.

III. Automated Document Analysis a. The rejection section is scanned to identify patterns of rejections. Such patterns include a rejection announcement, a reason for the rejection and the patent number or other identification of the document which forms the grounds for the rejection.

b. The output of stage (a) is organized into a list of 100 rejections (each line in the list includes the application number, the referenced patent number, numbers of the rejected claims and a code for the rejection reason). Each list is added into a separate folder that also includes the original image file downloaded from the USPTO for manual check.

IV. Manual Document Analysis (i) The automated document analysis—stage 2—is followed by a manual analysis—stage 3. The main purpose of the manual analysis is to identify errors in the automated process. Common errors include:

a) Irrelevant text from the header and footer of the document is included (e.g., serial number, file names, etc.).

b) Handwritten scribbles or lines on the scanned documents are converted to gibberish in the text file.

c) Documents may be scanned in low quality by the USPTO, which may cause a distortion in the document textual features.

d) Mathematical formulas, as well as molecular structure, may be presented poorly.

e) Ensure the Examination Report refers to the originally filed claims, and not say to those of a preliminary amendment or the like, in which case concepts formation is liable to be distorted.

V. Word Stemming

We devote attention to technical phrases in our search algorithm for two main reasons. First, technical phrases are central to patent documents, so that correct identification of the technical phrases is part of correct categorization of the document itself. Second, the present algorithm is intended to identify relatedness of different technical phrases, unlike classical models of textual search that rely on keyword similarity between documents.

(i) Automated stem: words are stemmed according to accepted stemming rules (e.g., dropping stop words, removing ing, etc.).

Words are dropped if: (a) the first character is a digit, (b) they contains characters such as: "~", "#", "±" and (c) they feature only digits.

(ii) Manual stem of technical phrases: patent documents usually include abbreviations of technical phrases. Such phrases are likely to describe the key scientific concepts of the patent. Technical phrases may for example be distinguished by use of capital letters. Therefore, if the first letter of the word is in an upper case, the feature is tagged as a potential technical phrase. In addition, all words are scanned manually to identify other technical phrases (i.e., "JavaBean"). Upper cased words are not stemmed, unless they are in a plural form. For example, the word "ETCs" was stemmed to "ETC", and the word "OLED" was not stemmed to "OL". Chemical elements (i.e., Li or $CO_2$) are also identified by their first capital letter; they are tagged and not stemmed.

(iii) We drop abbreviations for which we cannot find a scientific meaning (in most cases, these abbreviation represent errors in converting documents from IMAGE to TXT format.

VI. Word Indexing and Frequency

We index each stemmed word and compute its frequency. We compute the frequency of words at two levels:

(i) Patent level—The frequency of a word at the patent level is the number of times the stemmed word appears in the patent claims.

(ii) Concept level—The frequency of a word at the concept level is the number of times the stemmed word appears in the concept, where the concept includes all words appearing in the original claims of the rejected application and in the claims of the prior-art. This frequency is computed for each concept where the stemmed word appears.

Stage 2: Computing Conceptual and Semantic Relation

I. Conceptual Relation

Based on the training-set constructed at stage 1, we form conceptual links between words and technical phrases. These links form a 'dictionary' that informs us which words are used to describe similar inventions. The conceptual relation between patent pairs is computed at two steps. In the first step, we form a probabilistic concept vector for each patent. Each concept in this vector is assigned a value between zero and one that represents the probability the concept is associated with the patent (CSV). In the second step, we compute the conceptual relatedness of the patent pairs as the extent to which their probabilistic concept vectors overlap. This procedure means that relatedness is determined not on the basis of semantic similarity, but on the similarity of the expected scientific idea each patent contains.

We adopt the probabilistic Baysian model as our learning algorithm. Define $$P(c_i | \vec{d}_j) = \frac{P(c_i) \cdot P(\vec{d}_j | c_i)}{P(\vec{d}_j)}$$

as the CSV function for each patent (outside the training-set) and concept, that is $P(c_i | \vec{d}_j)$ is the probability of observing the concept $c_i$ conditional on the bag-of-words $\vec{d}_j$, where $\vec{d}_j = (\omega_{1j}, \ldots, \omega_{\tau j})$, $\omega \in (0,1)$ and $\tau$ is the total number of features in the document collections. We implement the naive Bayesian classifier approach and assume the appearance of words in documents is independent from one another:

$$P(\vec{d}_j | c_i) = \prod_{k=1}^{\tau} P(\omega_{kj} | c_i).$$

Due to the binary assumption, $P(\omega_{kj}|c_i)$ can be written as $P^{\omega_{kj}}_{kj} \sim (1-p^{\omega_{kj}}_{kj})$, where $P_{kj}$ is the probability the word k appears in document j conditional on observing concept i. Simple mathematical manipulations give the estimation equation for the CSV:

$$CSV_{ij} = \sum_{k=1}^{\tau} \omega_{kj} \log \frac{p_{ki} \cdot (1 - p_{k\bar{i}})}{p_{k\bar{i}} \cdot (1 - p_{ki})}$$

where, $P_{ki}$ is the probability the word k appears in concept i and $P_{k\bar{i}}$ is the probability the word k appears in concepts other than i. These probabilities are computed from the training-set. In total, we compute $2\tau$ parameters $\{p_{1i}, \ldots, p_{\tau i}\}$ for each concept and $2\tau \times C$ parameters overall, where C is the total number of concepts in the training-set. These parameters are approximated using relative frequencies from the training set Finally, having computed the probabilistic concepts vector for each patent, conceptual similarity for patent pairs is computed as the degree the concepts vector overlaps. To reduce the dimensionality of the concepts vector, we include only the top 100 concepts, as ranked by their CSV. Patent pairs that are associated with larger numbers of concepts in common are classified as being more scientifically related. Other metrics may be used. To refine this measure we also weigh the appearance of concepts according to their rank in the vector. Thus, concept vectors are assumed to be more similar if they include more of the same concepts and have a greater similarity of concept ranking.

Figure 11:
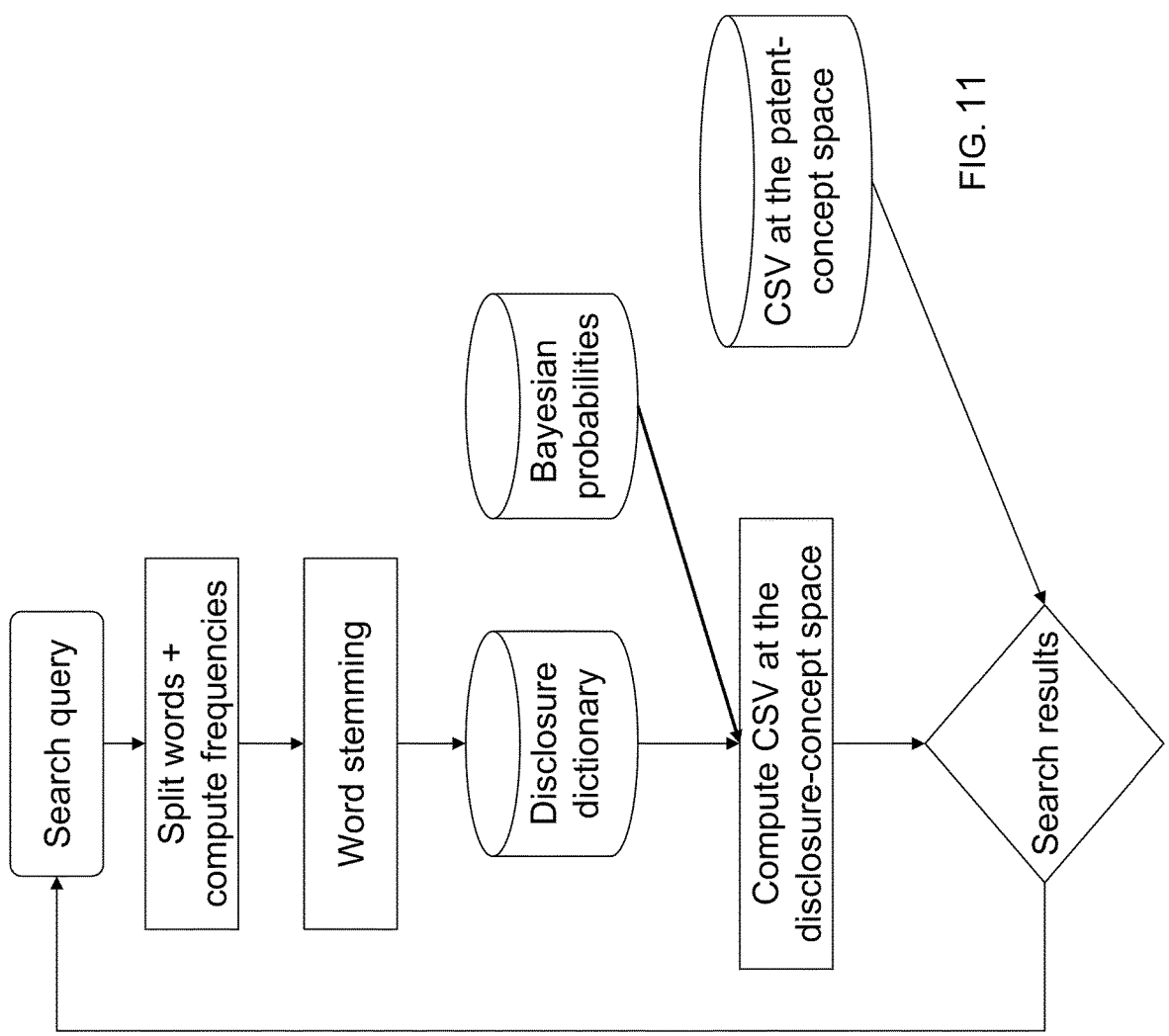

Reference is now made to FIG. 11, which shows the search process. Each technical phrase belongs to a concept that includes other technical phrases, so technical phrases can now be identified in the query document. The same techniques as used before such as word stemming, dictionaries, may be used to obtain the phrases in a more uniform manner so that CSVs may be computed for the query (the disclosure). CSV's may then be computed for the target documents and then the target documents may be ranked in accordance with their relationship with the query document, the closest documents being output to the user.

II. Semantic Relation

As a benchmark to our conceptual relation algorithm, we also compute the semantic relation for the patent pairs in our dataset. We weigh textual features according to the ltc (logarithmic weighting of occurrence count, inverse document frequency and cosine normalization) scheme:

$$ltc(t_k, d_j) = (1 + \log \text{count}(t_k, d_j)) \cdot \log \frac{N}{df_k}, \text{ for count}(t_k, d_j) > 0$$

and, $$ltc(t_k, d_j) = 0, \text{ for count}(t_k, d_j) = 0$$

where, N is the total number of patent documents and $df_k$ is the number of patent documents that contain the word k. We normalize term weights to control for document length, as following:

$$\omega_{kj} = \frac{ltc(t_k, d_j)}{\sqrt{\sum_{s=1}^{r} ltc(t_s, d_j)^2}}$$

where, r is the total number of textual features. Finally, given the word weighting vectors, we define the semantic similarity between patent pairs as:

$$\text{Text}_{ij} = \frac{1}{K} \sum_{\omega} (\omega_{kj} - \omega_{ki})^2$$

where, K is the number of distinct words that appear in documents and i and j. It is noted that technical phrases are clustered and are not counted as separate features in either of the conceptual or semantic algorithms.

Search Results Interface

The output of the search algorithm is a list of suggested patents prior-art for each invention disclosure. FIG. 12 presents the main interface layout for the disclosure and search results. The user inserts a query in the form of disclosure text in the upper box and is provided with related prior art in the lower box.

Disclosure

The disclosure for the search query can be described in two forms: free-text and key-words. The free-text section allows the user to describe her invention in natural language, with no specific structure or length limitations. The key-words section aims to define the technical field of the invention and refine the search results. The search can be performed on the basis of free-text, key-words or both. Search which is based on free-text benefits from a richer disclosure which can potentially lead to the retrieval of more accurate search results. However, the drawback of the free-text search is risking lack of technical focus, which may equally well lead to noisier search results.

Search Results

I. Prior-Art Selection

Before conducting the search, the user selects the characteristics of the retrieved prior-art. The selection criteria are presented in a separate 'pop-up' screen when clicking on the "Search Prior-Art" button. The selection criteria include: grant year (range or specific year), application year (range or specific year) technology area (up to six-digit IPC), assignee name and number of prior-arts to appear in the search results. The default is no selection on prior-art characteristics and performing a combined free-text and key-words search (if made available by the user).

II. Search Results Layout

Each prior-art in the search result may include certain on-screen information: (i) a relatedness measure, here shown presented as a star icon on a horizontal bar above the prior-art document title. The right-end of the bar is coloured in green, where the left-end of the bar is coloured in red. Relatedness rises as we move from the green shade to the red shade of the colour spectrum. Alternatives include showing the relatedness as a number or a ratio.

(ii) Title—the full title of the prior-art may be listed under the relatedness bar. The title is linked to a separate page that contains detailed patent information, such as full-text, technology fields, citations etc.

(iii) Main patent characteristics—patent number, filing date and assignee name appear below the title line.

A prototype allows the user to export the disclosure and corresponding search results to office applications, such as Word or Excel, for further analysis.

Empirical Evaluation

A test of a prototype of the search engine used a sample of about 8 thousand applications and 16.5 thousand application-prior-art links, to examine the ability of an algorithm according to the present embodiments to correctly predict the prior-art referenced by patent examiners for 500 patent applications.

For each application-prior-art pair (outside the training-set), we select ten control pairs. The control pair includes the same application as in the actual pair, where this application is tied to a placebo prior-art. The placebo prior-art is from the same technology field (4-digit IPC) as the actual prior-art. Based on our algorithm, we rank, for each application, the prior-arts and examine the extent to which the actual prior-art receives a high ranking. More details of the experiment are discussed below.

We find that in more than 80 percent of the applications, the actual prior-art (i.e., the prior-art cited by the patent examiner) is at the top two selections, where in more than 66 percent of the applications the actual prior-art appears in the first selection. We compare this performance to the semantic similarity algorithm. The semantic algorithm ranks the actual prior-art in the top two selections in only 41 percent of the applications, and as the first selection in only about 23 percent of the applications.

For example, the application of U.S. Pat. No. 7,183,807, "Method, apparatus and system of domino multiplexing" (IPC H03K/Pulse Technique), was found to be related to prior-art U.S. Pat. No. 4,899,066, "OR-type CMOS logic circuit with fast precharging" (IPC G11C/Static Stores). The most frequent words in the claims of the application are: [arrangement, block, connected, domino, output, P-channel, preconditioned, N-channel, state]. The most frequent words in the prior-art are: [CMOS, connected, data, line, MOS, precharging, single, portions, transistor]. The two patents share very few words in common; hence their semantic similarity is low. Yet, the search engine finds out about the relation between the technical phrases CMOS (Complementary metal-oxide-semiconductor, a transistor type) and P-channel (another transistor type) from the training-set, and identifies a strong conceptual similarity. The learning of the relatedness of CMOS and P-channel was through the link between patent application U.S. Pat. No. 7,161,387 and prior-art U.S. Pat. No. 6,774,696 (as referenced by the examiner). The application contains the phrase P-channel, where the prior-art contains the phrase CMOS.

Patent Information

The data used in the experiment is from the United States Patents and Trademarks Office (USPTO). We extract all characteristics and textual information for all patents granted in the USPTO from 1975 to 2007. The patent database includes two sections: (1) the words for each patent claim and (2) patent characteristics, such as: grant and application date, inventors, assignees, addresses and nationality, citations to other patents, citations to non-patent literature, technology area classification (International Patent Classification and US class). In total, the patent database includes 4,069,412 patents distributed across main technology areas, as follows: 19% Chemicals, 14% Computers and Communications, 8% Drugs and Medical, 18% Electrical and Electronics, 22% Mechanicals and the remaining patents are classified in other technology areas.

Examination Reports and Original Claims

The examination reports and the application original claims are from the File Wrapper section of the USPTO. The File Wrapper is a collection of documents tracking the patent application process. We use two documents: (1) non-final rejections and (2) original claims. The non-final rejection is the initial response of the patent examiner to the patent application. Typically, the non-final rejection indicates a set of claims that are rejected by the patent examiner and related prior-art that is the basis of the rejection. The application document includes the original claims that were submitted to the USPTO to which the non-final rejection document refers. We exclude applications of patents in the field of chemicals and drugs because these applications usually include molecular structure and other non-textual features.

As shown in table 3, following the manual and automated processes described above, our training-set database includes 7,992 non-final rejections and the same number of original claims. From the non-final rejections we identify 16,444 conceptual relations between the features in the original applications and the features in the prior-art. On average, a rejected application is referenced by 2.06 prior-arts. In only about 38.3 percent of the examiner rejections, the referenced prior-art is at the same four-digit IPC as the application. This percentage drops to about 17 percent for six-digit IPC. This means that as the prior-art and the rejections are from different technology areas, they are likely to have different textual representation. On average, the lag between the filing year of the application and the grant year of the prior-art is 4.82 years.

TABLE 1

DESCRIPTIVE STATISTICS FOR PATENT VARIABLES
Table 3 Descriptive Statistics For Patent Variables

|  | Total no. of patents | % patents receiving cites | Total no. of cites | % corporate | Mean no. of claims | Mean grant year |
|---|---|---|---|---|---|---|
| Applications |  |  |  |  |  |  |
| All technology areas | 7,992 | 4.6% | 705 | 40.7% | 22.9 | 2006 |
| Computers and Communications | 2,991 | 3.2% | 131 | 47.3% | 25.6 | 2006 |
| Electrical and Electronics | 2,219 | 7.8% | 419 | 36.9% | 20.3 | 2006 |
| Mechanicals | 1,214 | 4.8% | 105 | 29.8% | 19.7 | 2006 |
| Prior-art |  |  |  |  |  |  |
| All technology areas | 16,126 | 99.6% | 274,171 | 37.1% | 18.9 | 1998 |
| Computers and Communications | 6,154 | 99.7% | 133,528 | 46.4% | 21.9 | 2000 |
| Electrical and Electronics | 4,674 | 99.7% | 71,894 | 35.5% | 17.2 | 1998 |
| Mechanicals | 2,680 | 99.3% | 33,931 | 25.1% | 16.0 | 1996 |

TABLE 2

DESCRIPTIVE STATISTICS FOR REJECTIONS
Table 4 Descriptive Statistics for Rejections

| All rejections | No. of applications | No. of prior-art | Prior-art per application | Applications per prior-art | % some main tech area | % some 4-digit IPC | % same 6-digit IPC |
|---|---|---|---|---|---|---|---|
| All technology areas | 7,992 | 16,126 | 2.06 | 1.02 | 76.5% | 38.3% | 17.0% |
| Computers and Communications | 2,991 | 6,154 | 2.14 | 1.03 | 82.4% | 37.2% | 14.2% |
| Electrical and Electronics | 2,219 | 4,674 | 2.07 | 1.02 | 80.8% | 40.2% | 18.4% |
| Mechanicals | 1,214 | 2,680 | 2.00 | 1.01 | 75.8% | 38.7% | 21.9% |

Technical Phrases

Patent documents usually include technical phrases that describe their scientific content. The learning algorithm of the present embodiments is especially important in identifying scientific relations between technical phrases, which differ semantically but may represent related scientific concepts. For example, the technical phrase CDPD, which stands for Cellular Digital Packet Data, is central to the idea described in U.S. Pat. No. 5,805,997.

On average, a concept includes 116 stemmed words, where 68 words appear in the prior-art and 62 words appear in the original claims of the application. The total number of words and technical phrases in the training-set is 28,227. These words appear 10,085,912 times.

Table 6 summarizes examples of several common technical phrases that appear in the training-set.

TABLE 3

DESCRIPTIVE STATISTICS FOR TEXTUALS FEATURES
Table 5 Descriptive Statistics for Textual Features

| | Total feature appearances | Total no. of features | Mean feature frequency | Total phrase appearances | Total no. of tech phrases | Mean number of tech phrases |
|---|---|---|---|---|---|---|
| Applications | | | | | | |
| All technology areas | 3,054,542 | 19,628 | 61.91 | 47,962 | 2,471 | 1.08 |
| Computers and Communications | 1,316,250 | 10,974 | 61.95 | 23,277 | 1,457 | 1.21 |
| Electrical and Electronics | 742,746 | 8,637 | 58.50 | 14,155 | 884 | 1.27 |
| Mechanicals | 409,790 | 6,238 | 63.09 | 3,606 | 358 | 0.69 |
| Prior-art | | | | | | |
| All technology areas | 7,031,370 | 18,394 | 67.83 | 102,339 | 2,670 | 0.95 |
| Computers and Communications | 3,158,589 | 11,545 | 68.48 | 53,005 | 1,849 | 1.11 |
| Electrical and Electronics | 1,853,808 | 9,491 | 65.36 | 32,436 | 949 | 1.08 |
| Mechanicals | 1,034,988 | 7,349 | 69.80 | 7,919 | 412 | 0.58 |

TABLE 4

EXAMPLES OF COMMON TECHNICAL PHRASES
Table 7 - Examples of Common Technical Phrases.

| | Technical phrase | Abbreviation | Prior-art frequency | Application frequency | Meaning |
|---|---|---|---|---|---|
| (1) | Radio-frequency identification | RFID | 577 | 1411 | An automatic identification method, relying on storing and remotely retrieving data using devices called RFID tags or transponders. |
| (2) | Metal-oxide-semiconductor field-effect transistor | MOSFET | 576 | 587 | A device used to amplify or switch electronic signals. It is by far the most common field-effect transistor in both digital and analog circuits. |
| (3) | Universal Serial Bus | USB | 515 | 490 | A serial bus standard to interface devices. |
| (4) | Global Positioning System | GPS | 524 | 1365 | A satellite-based navigation system made up of a network of 24 satellites placed into orbit by the U.S. Department of Defense. |
| (5) | Extensible Markup Language | XML | 273 | 334 | A general-purpose specification for creating custom markup languages. |
| (6) | Dynamic random access memory | DRAM | 391 | 304 | A type of random access memory that stores each bit of data in a separate capacitor within an integrated circuit. |
| (7) | Microelectromechanical systems | MEMS | 377 | 170 | The technology of the very small, and merges at the nano-scale into nanoelectromechanical systems and nanotechnology. |
| (8) | Printed circuit board | PCB | 268 | 253 | a thin plate on which chips and other electronic components are placed. |
| (9) | Voltage-controlled oscillator | VCO | 194 | 235 | An electronic oscillator designed to be controlled in oscillation frequency by a voltage input. |
| (10) | Fast Fourier transform | FFT | 41 | 386 | An efficient algorithm to compute the discrete Fourier transform and its inverse. |

It is possible to identify technical phrases and their meaning manually. First, we identify all words that begin with a capital letter. Second, for each word and abbreviation we manually examine whether it represents a technical phrase, using various technical sources (such as WikiPedia, and Abbreviations.com). This process leaves us with 4,699 technical phrases. Table 7 summarizes several examples of related technical phrases. The relatedness is based on the extent different technical phrases co-appear in the same concepts.

TABLE 5

EXAMPLES OF RELATED TECHNICAL PHRASES
Table 8 Examples of related technical Phrases

First phrase

| | Technical phrase 1 | Abbreviation 1 | Meaning |
|---|---|---|---|
| (1) | Storage Area Network | SAN | A network designed to attach computer storage devices. |
| (2) | Cathode Ray Tube | CRT | An evacuated glass envelope containing an electron gun and a fluorescent screen |
| (3) | Program Clock Reference | PCR | A time stamp used in digital video compression that indicates the system time clock's value the instant the time stamped packet leaves the encoder. |
| (4) | Time-Division Multiplexing | TDM | A method for sending multiple digital signals along a single telecommunications transmission path |
| (5) | Protocol Data Units | PDU | Information that is delivered as a unit among peer entities of a network and that may contain control information, address information, or data. |
| (6) | Random Access Memory | RAM | A type of computer data storage. |
| (7) | Organic Light Emitting Devices | OLED | any light-emitting diode whose emissive electroluminescent layer is composed of a film of organic compounds. |
| (8) | Wavelength Division Multiplexed | WDM | A technology which multiplexes multiple optical carrier signals on a single optical fiber by using different wavelengths of laser light to carry different signals. |
| (9) | Field Effect Transistor | FET | A type of transistor that relies on an electric field to control the shape and hence the conductivity of a 'channel' in a semiconductor material. |
| (10) | Universal Asynchronous Receiver/Transmitter | UART | A piece of computer hardware that translates data between parallel and serial forms. |

Second phrase

| | Technical phrase 2 | Abbreviation 2 | Meaning |
|---|---|---|---|
| (1) | Small computer system interface | SCSI | A set of standards for physically connecting and transferring data between computers and peripheral devices. |
| (2) | Digital Micro-Mirror Device | DMD | An optical semiconductor on which DLP technology is based. |
| (3) | Packetized Elementary Stream | PES | A specification defined by the MPEG communication protocol that allows an Elementary stream to be divided into packets. |
| (4) | Local Area Network | LAN | A computer network covering a small geographic area, like a home, office, or group of buildings. |
| (5) | Hybrid Automatic Repeat-Query | H-ARQ | An error control method for data transmission which uses acknowledgments and timeouts to achieve reliable data transmission. |
| (6) | Operating System | OS | A software that manages computer resources and provides programmers/users with an interface used to access those resources. |
| (7) | Organic Metal-Semiconductor Field-Effect transistor | OMESFET | An organic unipolar device, because its conduction process involves predominantly only one kind of carrier. |
| (8) | Gradient-index | GRIN | Gradient-index optics is the branch of optics covering optical effects produced by a gradual variation of the refractive index of a material. |

TABLE 5-continued

EXAMPLES OF RELATED TECHNICAL PHRASES
Table 8 Examples of related technical Phrases

| | | | |
|---|---|---|---|
| (9) | Direct Space-to-Time Pulse Generators | DSTPG | An apparatus that employs a spectral dispersing element to spectrally disperse a single pulse of radiation to create multiple spatially separated sequences of radiation pulses. |
| (10) | Data Carrier Detect | DCD | A signal present inside an RS-232 serial communications cable that goes between a computer and another device, such as a modem. |

For example, the phrase SCSI appears six times in the original claims of application U.S. Pat. No. 7,181,553. These claims were rejected over U.S. Pat. No. 7,080,140, in which the phrase SAN appears three times. We identify a scientific relation between the two phrases by linking together the rejected application and the relevant prior-art. Another example is the phrase DMD, which appears eleven times in application U.S. Pat. No. 7,180,554, and the phrase CRT which appears eight times in the claims of the prior-art U.S. Pat. No. 6,456,432.

Evaluation

Experiment Design

We use the data described in the previous section to test the performance of our conceptual relation algorithm and compare it to the performance of a semantic similarity algorithm, used in current market solutions. We examine the ability of the conceptual and semantic algorithms to predict the prior-art cited by the patent examiner for the applications in our sample.

For each application-prior-art pair (outside the training-set), we select ten control pairs. The control pair includes the same application as in the actual pair, where this application is tied to a placebo prior-art. The placebo prior-art is from the same technology field (4-digit IPC) as the actual prior-art. Based on our algorithm, we rank, for each application, the prior-arts and examine the extent to which the actual prior-art receives a high ranking.

TABLE 9

Rankings for U.S. Pat. No. 7,143,262 and related prior-art 5390315.
The additional prior-arts for this application are the controls.

| Application Patent # | Rank | Prior-art | Conceptual measure | Prior-art | Semantic distance |
|---|---|---|---|---|---|
| 7,143,262 | 1 | 5390315 | 0.213 | 5113041 | 0.0096 |
| | 2 | 5111384 | 0.039 | 5111384 | 0.0125 |
| | 3 | 5111424 | 0.025 | 4945505 | 0.0132 |

TABLE 9-continued

Rankings for U.S. Pat. No. 7,143,262 and related prior-art 5390315.
The additional prior-arts for this application are the controls.

| Application Patent # | Rank | Prior-art | Conceptual measure | Prior-art | Semantic distance |
|---|---|---|---|---|---|
| | 4 | 4959782 | 0.020 | 4959782 | 0.0142 |
| | 5 | 5111421 | 0.017 | 5390315 | 0.0144 |
| | 6 | 5111431 | 0.013 | 5113042 | 0.0145 |
| | 7 | 4945505 | 0.012 | 5113363 | 0.0151 |
| | 8 | 5113363 | 0.007 | 5111431 | 0.0152 |
| | 9 | 5113361 | 0.005 | 5111424 | 0.0153 |
| | 10 | 5113041 | 0.003 | 5113361 | 0.0170 |
| | 11 | 5113042 | 0.002 | 5111421 | 0.0170 |

Results

Table 10 below reports mean comparison tests for the difference of the conceptual and semantic measures between the actual rejections and their controls. For the conceptual measure (Panel A), the average conceptual measures for actual rejection pairs is 0.38, where the average conceptual measure for the control pairs is 0.12. This means that, on average, the conceptual measure for the actual rejections is 2 times larger than the conceptual measure for the control. For the semantic measure (panel B), the average semantic distance for the actual rejections is 0.015 and for the controls is 0.018. Although the difference in means is significant at the 1 percent level (thus, actual rejections have a significantly greater similarity than the controls, this difference is not quantitatively large, as it accounts for only 18 percent of the average control semantic measure, as compared to 204 percent for the conceptual measure. This pattern of results is robust across main technology areas.

TABLE 6

Table 10

| | Actual rejections | | | Control | | |
|---|---|---|---|---|---|---|
| Applications | # Pairs | Mean | Std. Dev. | # Pairs | Mean | Std. Dev. |
| PANEL A: MEAN COMPARISON: CONCEPTUAL MEASURE | | | | | | |
| All technology areas | 500 | 0.38 | 0.344 | 5,000 | 0.12 | 0.189 |
| Difference in means | | 0.254*** | | | | |
| t-statistics | | 26.05 | | | | |
| Computers and Communications | 169 | 0.32 | 0.322 | 1,690 | 0.09 | 0.172 |
| Difference in means | | 0.229*** | | | | |
| t-statistics | | 14.859 | | | | |
| Electrical and Electronics | 191 | 0.47 | 0.401 | 1,910 | 0.15 | 0.226 |
| Difference in means | | 0.315*** | | | | |
| t-statistics | | 16.852 | | | | |

TABLE 6-continued

Table 10

| Applications | Actual rejections | | | Control | | |
|---|---|---|---|---|---|---|
| | # Pairs | Mean | Std. Dev. | # Pairs | Mean | Std. Dev. |
| Mechanicals | 74 | 0.35 | 0.270 | 740 | 0.12 | 0.156 |
| Difference in means | | 0.227*** | | | | |
| t-statistics | | 10.997 | | | | |
| PANEL B: MEAN COMPARISON: SEMANTIC DISTANCE | | | | | | |
| All technology areas | 500 | 0.015 | 0.005 | 5,000 | 0.018 | 0.005 |
| Difference in means | | −0.002*** | | | | |
| t-statistics | | −8.907 | | | | |
| Computers and Communications | 169 | 0.015 | 0.005 | 1,690 | 0.017 | 0.005 |
| Difference in means | | −0.002*** | | | | |
| t-statistics | | −4.563 | | | | |
| Electrical and Electronics | 191 | 0.016 | 0.005 | 1,910 | 0.018 | 0.005 |
| Difference in means | | −0.002*** | | | | |
| t-statistics | | −5.721 | | | | |
| Mechanicals | 74 | 0.015 | 0.005 | 740 | 0.017 | 0.017 |
| Difference in means | | −0.002*** | | | | |
| t-statistics | | −3.472 | | | | |

***denotes a significance level of 1 percent.

We define the performance of our conceptual search engine using accepted criteria from the text categorization literature. For each patent pair we use our algorithm to determine whether the prior-art was cited by the patent examiner as a reason to reject the application, or whether the prior-art is a control. For each pair we already know whether it represents a rejection relation or if it is a control. Then, we examine to what extent our algorithm is able to correctly identify the actual rejections from the controls. Denote by a the number of times our algorithm identified correctly a rejection and b as the number of times our algorithm did not identify a correct rejection. The matrix of table 11, summarizes all possible outcomes:

TABLE 11

Matrix of all possible outcomes

| Actual/algorithm | Reject | Not-reject |
|---|---|---|
| Prior-art | A | B |
| Control | C | D |

Commonly used metrics in information retrieval research include recall and error. Recall is defined as a/(a+b) and error is defined as (b+c)/(a+b+c+d). Recall measures the extent to which the algorithm is able to correctly identify the rejections, where error measures the incorrect classifications.

Before discussing the performance of the conceptual and semantic measures, we discuss the classification rule. The present experiment attempts to classify a patent application into one of 11 categories, where each category is a prior-art document. Our classification rule is the following. For each application, we rank prior-art documents according to their distance (semantic and conceptual) from the application. Then, we classify only the first γ patents as related prior-art. The performance of the algorithms is mostly determined by the correct rejection classifications, in other words, the number of times that an actual rejection appears in the top γ selected prior-arts.

Recall and Error For Conceptual and Semantic Algorithm

Figure 14:
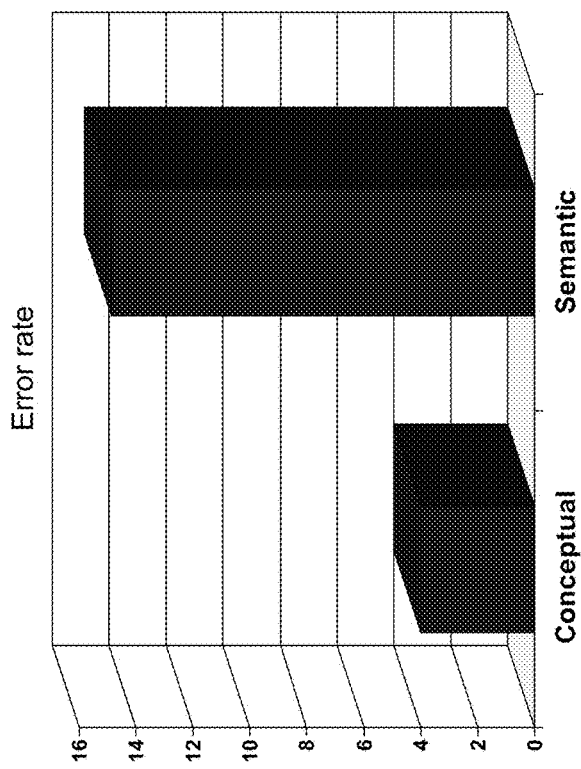
Figure 13:
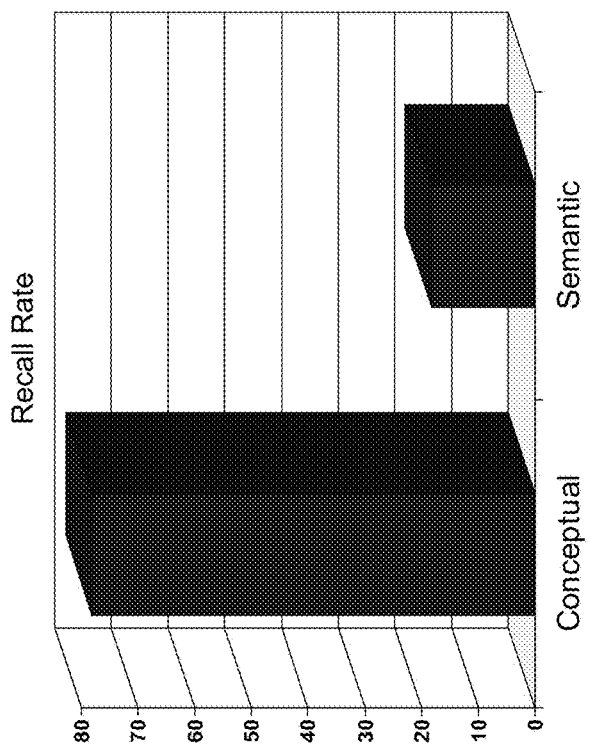

Table 12 and FIGS. 13 and 14 report the performance of the conceptual and semantic algorithms for γ=1 in other words the performance achieved when classifying as a rejection only the prior-art with the highest ranking, and classifying as a non-rejection all other prior-arts. In total, we classify 500 applications. The conceptual algorithm classifies 331 prior-arts correctly, i.e., for 331 applications, the actual rejection receives the highest conceptual ranking. On the contrary, the semantic algorithm classifies only 115 prior-arts correctly, i.e., for only 115 applications, the actual prior-art receives the highest semantic ranking. These figures mean that the recall measure for the conceptual algorithm is 0.66 (331/500), where the recall measure for the semantic algorithm is only 0.23 (115/500). Similarly, the error measure for the conceptual algorithm is 0.061 (192+192)/5,500, where the error measure for the semantic algorithm is 0.14 (388+388)/5,500.

TABLE 7

CONCEPTUAL AND TEXTUAL CATAGORIZATION
Table 12 Conceptual and Semantic Categorization

| | CONCEPTUAL | | | | TEXTUAL | | |
|---|---|---|---|---|---|---|---|
| | Rejection | Not-Reject | Total | | Rejection | Not-Reject | Total |
| | All technology areas | | | | | | |
| Rejection | 331 | 169 | 500 | Rejection | 115 | 385 | 500 |
| Control | 169 | 4,831 | 5,000 | Control | 385 | 4,615 | 5,000 |
| Total | 500 | 5,000 | 5,500 | Total | 500 | 5,000 | 5,500 |

TABLE 7-continued

CONCEPTUAL AND TEXTUAL CATAGORIZATION
Table 12 Conceptual and Semantic Categorization

| | CONCEPTUAL | | | | TEXTUAL | | |
|---|---|---|---|---|---|---|---|
| | Rejection | Not-Reject | Total | | Rejection | Not-Reject | Total |
| Computers and Communications | | | | | | | |
| Rejection | 121 | 48 | 169 | Rejection | 38 | 131 | 169 |
| Control | 48 | 1,642 | 1,690 | Control | 131 | 1,559 | 1,690 |
| Total | 169 | 1,690 | 1,859 | Total | 169 | 1,690 | 1,859 |
| Electrical and Electronics | | | | | | | |
| Rejection | 131 | 60 | 191 | Rejection | 46 | 145 | 191 |
| Control | 60 | 1,850 | 1,910 | Control | 145 | 1,765 | 1,910 |
| Total | 191 | 1,910 | 2,101 | Total | 191 | 1,910 | 2,101 |
| Mechanicals | | | | | | | |
| Rejection | 46 | 28 | 74 | Rejection | 18 | 56 | 74 |
| Control | 28 | 712 | 740 | Control | 56 | 684 | 740 |
| Total | 74 | 740 | 814 | Total | 74 | 740 | 814 |

Figure 15:
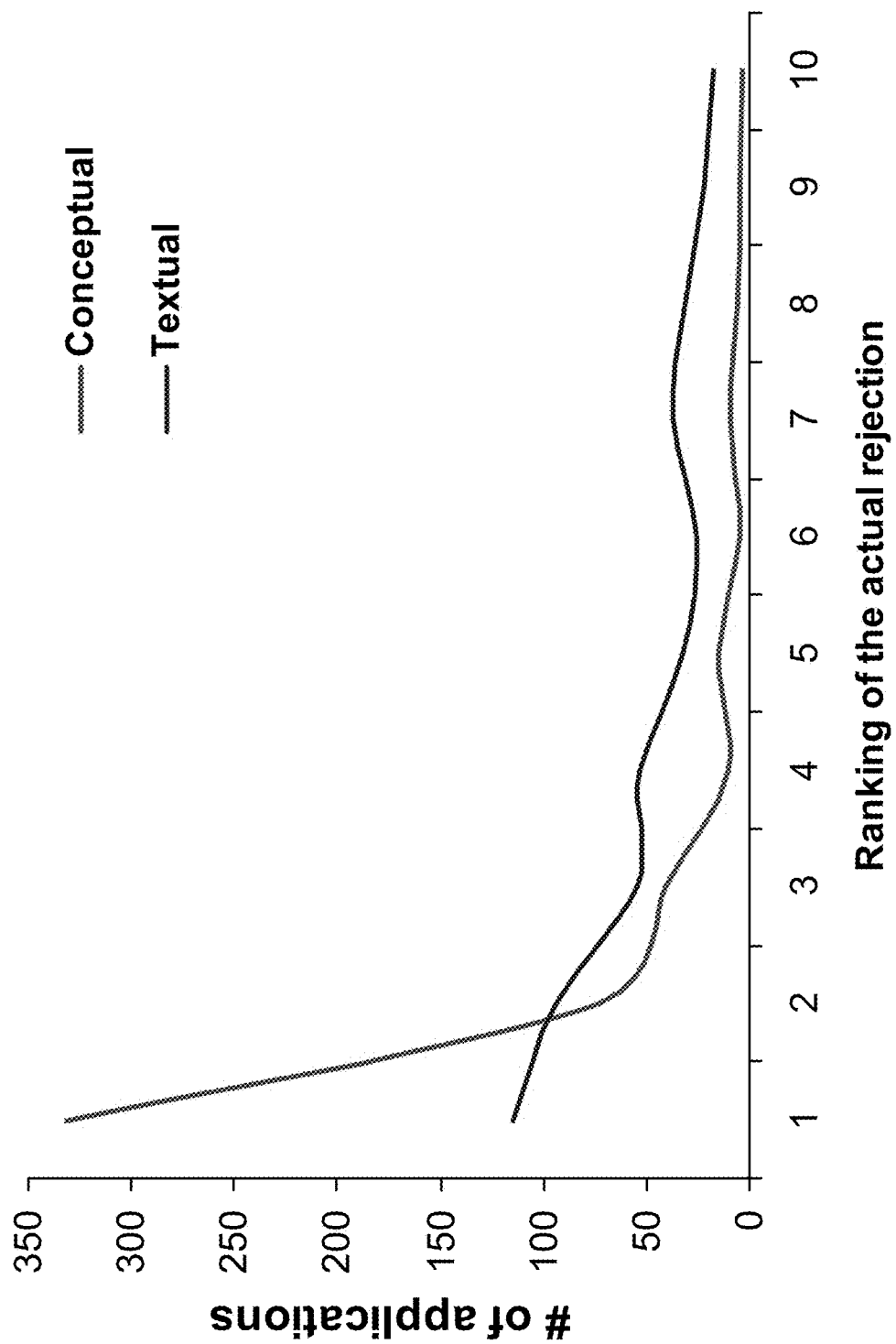

Reference is now made to FIG. 15, which shows the cumulative distribution of correct classification for the conceptual and semantic algorithms for different γ cut-offs. More than 80 percent of the actual rejections are ranked as the top two selections by the conceptual algorithm, as compared to only about 41 percent by the semantic algorithm.

Algorithm Performance and Training-Set Size

The performance results described above are based on all technology areas in our dataset. We would expect the performance of the conceptual algorithm to improve as the size of the training-set increases. A large training-set enables the conceptual algorithm to learn about more scientific relations between words and phrases, and improves the identification of relevant prior-arts.

Figure 16:
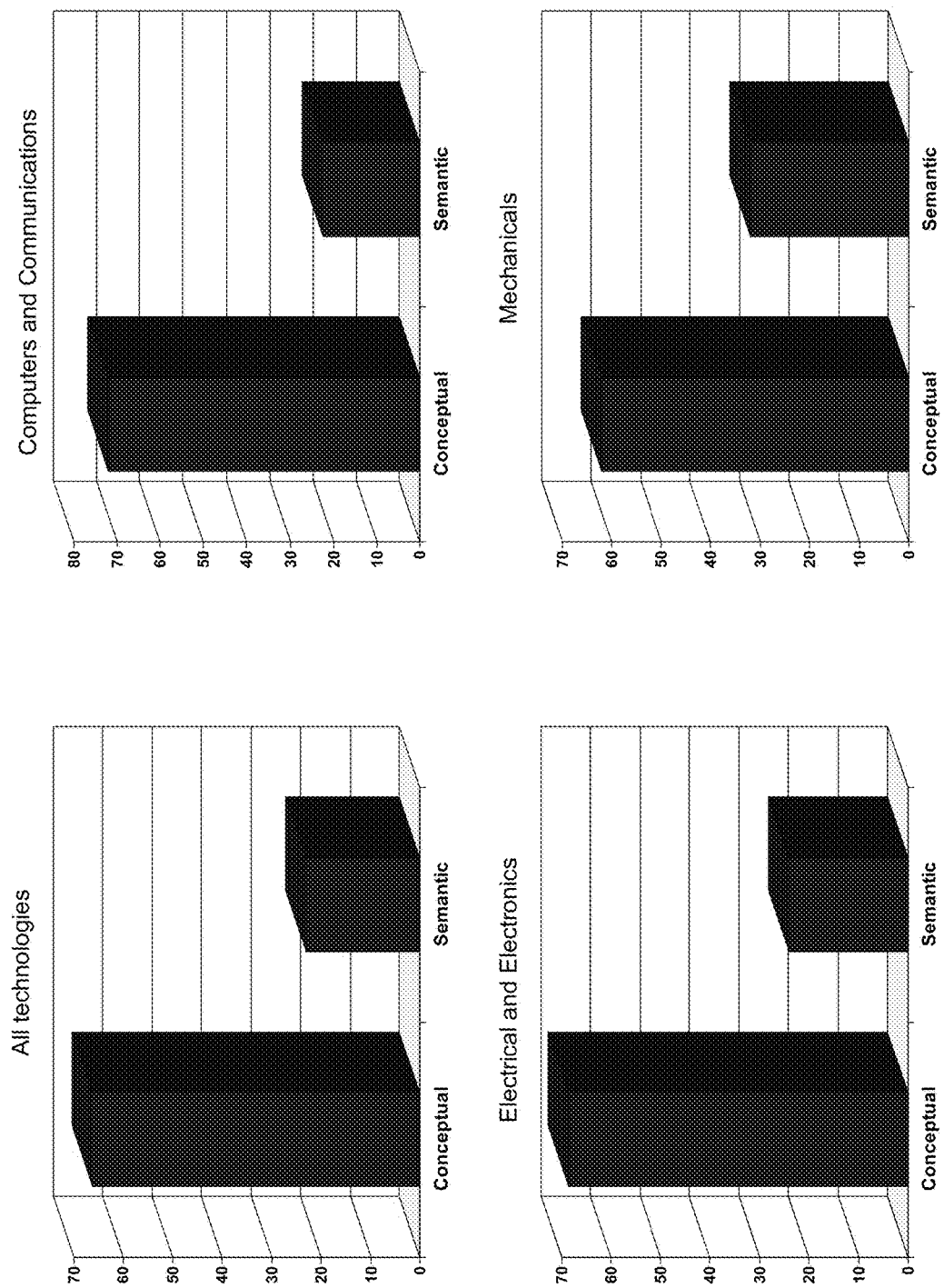
Figure 17:
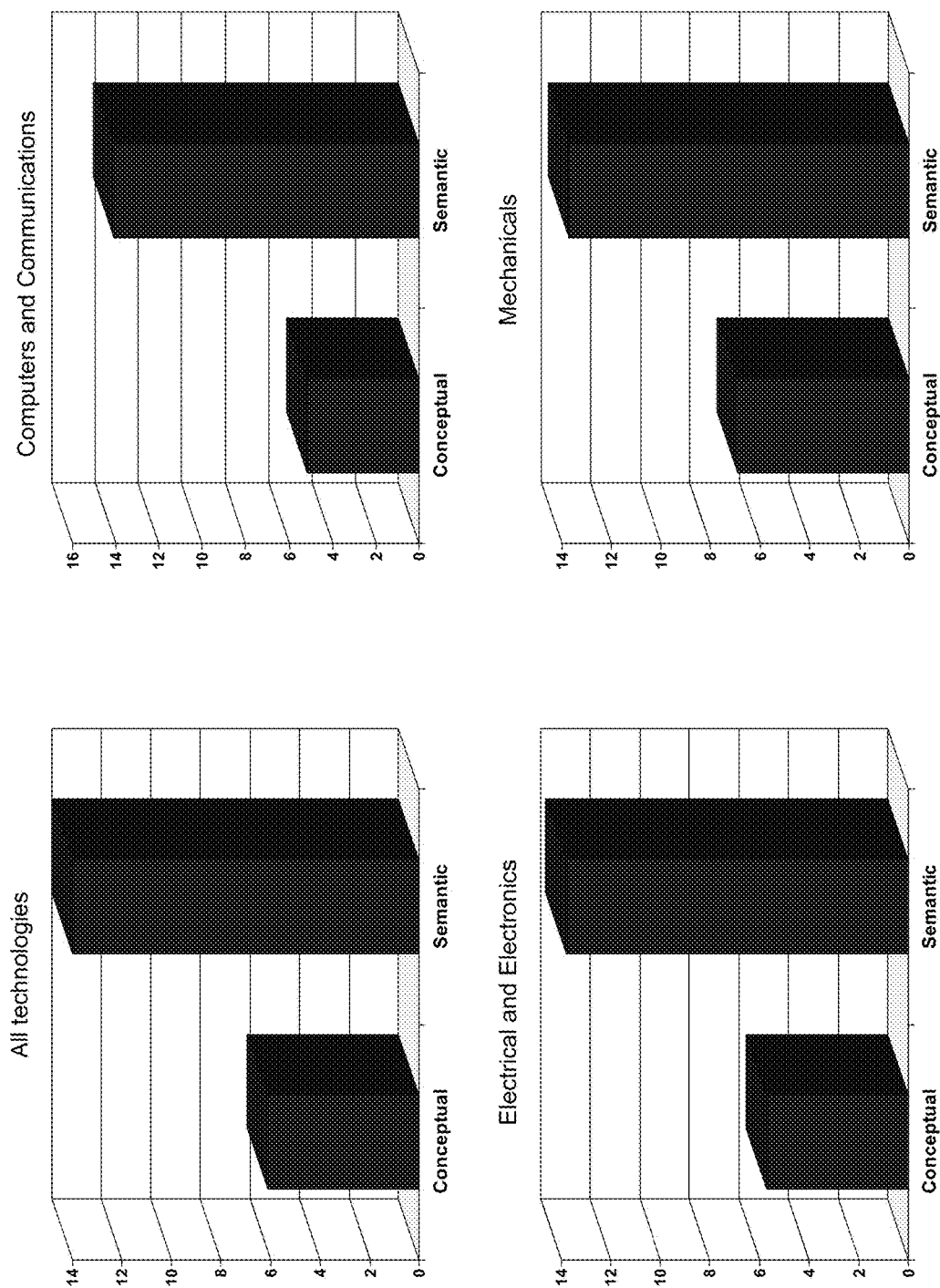

Reference is now made to FIGS. 16 and 17, which represent the performance of the conceptual algorithm per technology area. For each of all technologies, electrical and electronics, computers and communications, and mechanical, FIG. 16 charts correct classification between conceptual and semantic methods, and FIG. 17 shows the corresponding error rates for the two methods. Thus, we consider the technology area with the largest training-set ("Electric Digital Data Processing"). This technology area includes 1,916 documents (1,209 applications and 1,501 prior-arts). The recall rates for the conceptual and semantic algorithms are 78 and 18.2, respectively—FIG. 16, where the error rate is 4 and 14.9, respectively—FIG. 17.

Further Particulars of Search Models

In the following, further particulars are given of possible search models, with reference to attached FIGS. 18A, 18B and 19.

As discussed, extraction is carried out of the complete set of documents that relate to the patent examination process. These documents are used to group terms into categories of similar technical meaning. Based on these grouping and a scoring algorithm, we create a list of synonyms for each word used in the user search query, all as shown in FIG. 18A. FIG. 18A is an exemplary flow chart showing a procedure for providing a concept space for a patent document to be searched and mapping words including synonyms of the concept words to that space according to a preferred embodiment of the present invention. The prior art citations, the original application and the Examination literature are all used to define the concept space. Words may then be mapped to the concept space based on their frequency and position factors as discussed above to provide a weighting. Scores between the words may then be computed and a synonym database may be used to add words.

We classify examination documents using one or more of several models according to the information these documents contain about the technical similarity between the patent application and the prior-art cited by the patent examiner. FIG. 18B shows five possible models for obtaining search terms for the initial stage of establishing the concept space. The following models are generally applied separately for the USPTO and EPO examination records.

1. Use information for term grouping only from the initial examination report. The first non-final rejection is typically regarded as the most general in terms of related prior-art.

2. Use information for term grouping only from the last examination report. The last non-final rejection potentially encompasses more related prior-art than the initial non-final rejection. This may be followed by a notice of allowance.

3. A further search model includes non-final rejections that are followed by abandonment. Prior-art which leads to abandonment of the patent application is potentially more related to the patent application than prior-art that leads to allowance.

4. We also identify the actual search words used by the examiner during the examination process from the document "Examiner's search strategy and results".

5. The last model aggregates grouping information from two or more of the sources in 1-4.

Reference is now made to FIG. 19, which is a simplified diagram showing a process of synonym selection for use with an embodiment of the present invention. The user enters a search query and is presented with synonyms from a synonyms database to select. The system looks for words that can be split from the entered words and for stems of the entered words and then carries out a search based on weightings of query phrases in the results. More likely synonyms can be more highly weighted in the results or exact matches can be weighted more highly than matches of synonyms. Either way each document is given an overall score based on finding the search queries or the search queries modified by the synonyms.

The terms are used to rank search results and the end results are then submitted to the user as search results, with higher ranked and thus presumably more closely related prior art listed first.

SUMMARY

Prior-art search is central to the innovation process and for determining patent scope. The main challenge for automated prior-art search is how to identify scientific relations based on textual features for large scale data sets of patent documents.

Existing prior-art search engines rely on semantic similarity in determining scientific relatedness. In practice, such engines perform poorly, as usually conceptual relatedness is not tied to semantic similarity. The present embodiments disclose a search engine that measures the scientific relatedness of patent documents, based on a comprehensive training-set of professional evaluation of related technologies—patent examination reports from the patent application process. These reports provide information about prior-art referenced by patent examiners for rejected patent applications. Using machine learning techniques, we measure the relatedness of patent documents on the basis of the expected scientific ideas each patent contains.

To test the performance of the present algorithm, we examine the extent to which it is able to correctly classify a rejected application to its actual prior-art. Our algorithm yields substantial improvements over the semantic similarity algorithm. We find that for more than 80 percent of the applications, our algorithm ranks the actual prior-art at the top two selections, where for more than 66 percent of the applications the actual prior-art is ranked as the first selection. On the contrary, the semantic algorithm ranks the actual prior-art at the top two selections for only 42 percent of the applications, and only about 23 percent as the first selection.

Applications

A basic application is the searching of the patent literature to find matches to a query document. The query document may be a proposal for a new patent application that has not yet been filed or a proposal for a new technological venture in general, for the purpose of determining the viability of making the filing or for deciding on the advisability of investing in the venture. Alternatively the query document may be an actual patent application for which a user wishes to predict the patent office findings for whatever reason. As a further alternative the user may in fact be a patent office examiner wishing to find good and relevant prior art.

In a further application once the scores for each query-patent pair are available, the scores can be used to compute measures for risks to the viability of the patent application, for example risks of rejections and litigations. More specifically, one of the commercial applications is helping corporate IP experts to manage their patent portfolio and to help them generate licensing revenue by identifying technology and products on the market that may infringe their patents. In such a case, while the patent literature is used to find the groups of technical terms, the final search may be carried out on technical literature in general including company websites and business reports.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system having a set of instructions stored in at least one non-transitory computer-readable medium for controlling at least one digital computer in performing desired functions comprising:
   a set of instructions formed into a plurality of modules, said plurality of modules comprising:
   an input module configured to determine a training set of documents;
   a learning module configured to learn about relationships between technology phrases based on their rates of occurrence in related documents and form concepts by grouping together related technology phrases, said learning module being further configured to operate based on said training set of documents and inter-document relations such that said relationships are learned, wherein:
   a) said inter-document relations are derived from said training set of documents that are in electronic format;
   b) said learning module computes a relationship value between said technology phrases firstly by taking said technology phrases in turn and testing them for co-occurrence in said related documents such that the co-occurrence in said related documents is denoted A, secondly by taking said technology phrases in turn and testing them for co-occurrence in documents within the same technology class of documents such that the co-occurrence in said documents within said same technology class of documents is denoted B, and lastly by comparing the ratio between A and B against a predetermined threshold C such that when said ratio between A and B is greater than said predetermined threshold C then at least a subset of said technology phrases are consigned to a single concept; and a search module configured to use concepts derived from said learning module in a search for documents that are relevant to a query document, the search being based on frequency of occurrence of said concepts that are present in said query document, said concepts comprising said technology phrases that have been grouped together into concepts by said learning module, thereby allowing said search module to link documents that are relevant to said query document, wherein:
  a) said search module relies on a dictionary of concepts that provides for assignment of a probability score between said concepts and said training set of documents;
  b) said learning module is a probabilistic Bayesian algorithm used to train said learning module to provide a probabilistic relationship in terms of concept vectors;
  c) said search module compares said concept vectors that are assigned to said query document and in turn to a plurality of concept vectors that are assigned to a plurality of additional documents, whereby said concept vectors contain probability data of concepts being associated with said plurality of additional documents and thus a proximity score to said query document for each document belonging to said plurality of additional documents is determined;
  d) said technical phrases are composed by one or more said technical terms;
an output module configured to display at least a subset of said plurality of additional documents that have been selected, at least in part, according to said proximity score;
and thus said system improves, at least in part, upon the benchmark performances of a semantic-similarity-based system, automatically linking documents that are relevant to said query document, even in the absence of technical terms or technical phrases in common with said query document.

2. The system of claim 1, wherein said query document and said plurality of additional documents are each associated with a maximum number of most relevant concept vectors M such that the proximity of each document belonging to said plurality of additional documents to said query document is determined by the degree of overlapping of said maximum number of most relevant concept vectors M such that said output module enables displaying said at least a subset of said plurality of said additional documents based, at least in part, on said degree of overlapping.

3. The system of claim 2, wherein each concept vector is assigned a value between zero and one, such that said value represents the probability a given concept is associated with said plurality of additional documents.

4. The system of claim 2, wherein said maximum number of most relevant concept vectors M is one hundred.

5. The system of claim 2, wherein the value of said predetermined threshold C is one.

6. The system of claim 2, wherein said predetermined threshold C is dependant from said technology class of documents.

7. The system of claim 2, wherein said technical terms in said concepts are weighted, such that weights values represent a measure of the information content said technical terms provide in relation to which concepts they are associated.

8. The system of claim 2, wherein said proximity score is used as an input for an algorithm producing outputs selected from the group consisting of:
  visualization output, a litigation risk output, a patent application rejection risk output, an investment risk assessment output and a licensing opportunity assessment output.

9. A method comprising:
inputting data to determine a training set of documents;
learning via a learning module about relationships between technology phrases based on their rates of occurrence in related documents such that concepts are formed by grouping together related technology phrases, said learning module being configured to operate based on said training set of documents and inter-document relations such that said relationships are learned, wherein:
  a) said inter-document relations are derived from said training set of documents that are in electronic format;
  b) said learning module quantifies a relationship value between said technology phrases firstly by taking said technology phrases in turn and testing them for co-occurrence in said related documents such that the co-occurrence in said related documents is denoted A; secondly by taking said technology phrases in turn and testing them for co-occurrence in documents within the same technology class of documents such that the co-occurrence in said documents within said same technology class of documents is denoted B; and lastly by comparing the ratio between A and B against a predetermined threshold C such that when said ratio between A and B is greater than said predetermined threshold C then at least a subset of said technology phrases are consigned to a single concept; and
using said concepts that are derived from said learning module by a search module to search for documents that are relevant to a query document, the search being based on frequency of occurrence of said concepts that are present in said query document, said concepts comprising said technology phrases that have been grouped together into concepts by said learning module, thereby allowing said search module to find said documents that are relevant to said query document, wherein:
  a) said search module relies on a dictionary of concepts that provides for assignment of a probability score between said concepts and said training set of documents;
  b) said learning module is a probabilistic Bayesian algorithm used to train said learning module to provide a probabilistic relationship in terms of concept vectors;
  c) said search module compares said concept vectors that are assigned to said query document and in turn to a plurality of concept vectors that are assigned to a plurality of additional documents, whereby said concept vectors contain probability data of concepts being associated with said plurality of additional documents and thus a proximity score to said query document for each document belonging to said plurality of additional documents is determined;
  d) said technical phrases are composed by one or more said technical terms;

displaying at least a subset of said plurality of additional documents that have been selected, at least in part, according to said proximity score;

and thus said method improves, at least in part, upon the benchmark performances of a semantic-similarity-based method, automatically linking documents that are relevant to said query document, even in the absence of technical terms or technical phrases in common with said query document.

10. The method of claim 9, wherein said query document and said plurality of additional documents are each associated with a maximum number of most relevant concept vectors M such that the proximity of each document belonging to said plurality of additional documents to said query document is determined by the degree of overlapping of said maximum number of most relevant concept vectors M such that said output module enables displaying said at least a subset of said plurality of said additional documents based, at least in part, on said degree of overlapping.

11. The method of claim 10, wherein each concept vector is assigned a value between zero and one such that said value represents the probability a given concept is associated with said plurality of additional documents.

12. The method of claim 10, wherein said maximum number of most relevant concept vectors M is one hundred.

13. The method of claim 10, wherein the value of said predetermined threshold C is one.

14. The method of claim 10, wherein said predetermined threshold C is dependant from said technology class of documents.

15. The method of claim 10, wherein said technical terms in said concepts are weighted, such that weights values represent a measure of the information content said technical terms provide in relation to which concepts they are associated.

16. The method of claim 10, wherein said proximity score is used as an input for an algorithm producing outputs selected from the group consisting of: visualization output, a litigation risk output, a patent application rejection risk output, an investment risk assessment output and a licensing opportunity assessment output.

17. An apparatus, comprising:
at least one processor; and at least one non-transitory computer-readable medium including a computer program code; the at least one non-transitory computer-readable medium and the computer program code configured to, with the at least one processor, cause the apparatus to perform at least the following:
determining a training set of documents via an input module;
learning via a learning module about relationships between technology phrases based on their rates of occurrence in related documents to form concepts by grouping together related technology phrases, said learning module being configured to operate based on said training set of documents and inter-document relations such that said relationships are learned, wherein:
a) said inter-document relations are derived from said training set of documents that are in electronic format;
b) said learning module computes a relationship value between said technology phrases firstly by taking said technology phrases in turn and testing them for co-occurrence in said related documents such that the co-occurrence in said related documents is denoted A; secondly by taking said technology phrases in turn and testing them for co-occurrence in documents within the same technology class of documents such that the co-occurrence in said documents within said same technology class of documents is denoted B; and lastly by comparing the ratio between A and B against a predetermined threshold C such that when said ratio between A and B is greater than said predetermined threshold C then at least a subset of said technology phrases are consigned to a single concept; and using said concepts that are derived from said learning module via a search module to search for documents that are relevant to a query document, the search being based on frequency of occurrence of said concepts that are present in said query document, said concepts comprising said technology phrases that have been grouped together into concepts by said learning module, thereby allowing said search module to find said documents that are relevant to said query document, wherein:

a) said search module relies on a dictionary of concepts that provides for assignment of a probability score between said concepts and said training set of documents;

b) said learning module is a probabilistic Bayesian algorithm used to train said learning module to provide a probabilistic relationship in terms of concept vectors;

c) said search module compares said concept vectors that are assigned to said query document and in turn to a plurality of concept vectors that are assigned to a plurality of additional documents, whereby said concept vectors contain probability data of concepts being associated with said plurality of additional documents and thus a proximity score to said query document for each document belonging to said plurality of additional documents is determined;

d) said technical phrases are composed by one or more said technical terms;

displaying at least a subset of said plurality of additional documents that have been selected, at least in part, according to said proximity score;

and thus said apparatus improves, at least in part, upon the benchmark performances of a semantic-similarity-based apparatus, automatically linking documents that are relevant to said query document, even in the absence of technical terms or technical phrases in common with said query document.

18. The apparatus of claim 17, wherein said query document and said plurality of additional documents are each associated with a maximum number of most relevant concept vectors M such that the proximity of each document belonging to said plurality of additional documents to said query document is determined by the degree of overlapping of said maximum number of most relevant concept vectors M, such that said output module enables displaying said at least a subset of said plurality of said additional documents based, at least in part, on said degree of overlapping.

19. The apparatus of claim 18, wherein each concept vector is assigned a value between zero and one such that said value represents the probability a given concept is associated with said plurality of additional documents.

20. The apparatus of claim 18, wherein said maximum number of most relevant concept vectors M is one hundred.

21. The apparatus of claim 18, wherein the value of said predetermined threshold C is one.

22. The apparatus of claim 18, wherein said predetermined threshold C is dependant from said technology class of documents.

23. The apparatus of claim 18, wherein said technical terms in said concepts are weighted, such that weights values represent a measure of the information content said technical terms provide in relation to which concepts they are associated.

24. The apparatus of claim 18, wherein said proximity score is used as an input to accomplish tasks selected from the group consisting of: organizing a visualization output, assessing a litigation risk, assessing a rejection risk, assessing an investment risk, assessing a licensing opportunity.

* * * * *